(12) United States Patent
Choi et al.

(10) Patent No.: US 11,582,482 B2
(45) Date of Patent: Feb. 14, 2023

(54) IMAGE PREDICTION METHOD AND DEVICE FOR DERIVING CHROMA INTRA PREDICTION MODE

(71) Applicant: LG ELECTRONICS INC., Seoul (KR)

(72) Inventors: Jangwon Choi, Seoul (KR); Jin Heo, Seoul (KR); Sunmi Yoo, Seoul (KR); Ling Li, Seoul (KR); Jungah Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/299,630

(22) PCT Filed: Nov. 27, 2019

(86) PCT No.: PCT/KR2019/016414
§ 371 (c)(1),
(2) Date: Jun. 3, 2021

(87) PCT Pub. No.: WO2020/116848
PCT Pub. Date: Jun. 11, 2020

(65) Prior Publication Data
US 2022/0021902 A1     Jan. 20, 2022

Related U.S. Application Data

(60) Provisional application No. 62/787,737, filed on Jan. 2, 2019, provisional application No. 62/775,899, filed on Dec. 5, 2018.

(51) Int. Cl.
*H04N 19/593*     (2014.01)
*H04N 19/105*     (2014.01)
(Continued)

(52) U.S. Cl.
CPC ......... *H04N 19/593* (2014.11); *H04N 19/105* (2014.11); *H04N 19/11* (2014.11); *H04N 19/186* (2014.11)

(58) Field of Classification Search
CPC .. H04N 19/159; H04N 19/124; H04N 19/182; H04N 19/45
(Continued)

(56) References Cited

U.S. PATENT DOCUMENTS

2013/0336591 A1* 12/2013 Jeon ..................... H04N 19/593
382/238
2016/0227222 A1* 8/2016 Hu ........................ H04N 19/593
(Continued)

FOREIGN PATENT DOCUMENTS

| KR | 20130050900 A | 5/2013 |
|---|---|---|
| KR | 20180033302 A | 4/2018 |
| WO | 2018012808 A1 | 1/2018 |

OTHER PUBLICATIONS

L. Zhang, W.-J. Chien, J. Chen, X. Zhao and M. Karczewicz, "Multiple direct mode for intra coding," 2017 IEEE Visual Communications and Image Processing (VCIP), 2017, pp. 1-4, doi: 10.1109/VCIP.2017.8305108. (Year: 2017).*

*Primary Examiner* — Marnie A Matt
(74) *Attorney, Agent, or Firm* — Dentons US LLP

(57) ABSTRACT

An image decoding method according to the present document includes: a step for deriving a luma intra prediction mode; and a step for generating a chroma candidate mode list for a chroma block including a preset number of chroma intra candidates by using at least one among a DM, a planar mode, a DC mode, a vertical mode, a horizontal mode, and an up-right diagonal mode, which are derived from the luma intra prediction mode, wherein the DM is a prediction mode corresponding to a center (CR) position of the luma block, and the chroma intra candidates other than the DM can be (Continued)

derived through a duplicate check of the DM and a prediction mode corresponding to any one among the top left (TL), top right (TR), bottom left (BL), and bottom right (BR) of the luma block, the planar mode, the DC mode, the vertical mode, and the horizontal mode.

15 Claims, 36 Drawing Sheets

(51) Int. Cl.
  *H04N 19/11* (2014.01)
  *H04N 19/186* (2014.01)
(58) Field of Classification Search
  USPC .................................................. 375/240.13
  See application file for complete search history.

(56) References Cited

U.S. PATENT DOCUMENTS

| | | | |
|---|---|---|---|
| 2017/0105025 A1* | 4/2017 | Jeon | H04N 19/91 |
| 2017/0272748 A1* | 9/2017 | Seregin | H04N 19/119 |
| 2017/0366818 A1 | 12/2017 | Zhang et al. | |
| 2018/0063553 A1* | 3/2018 | Zhang | H04N 19/46 |
| 2018/0199061 A1* | 7/2018 | Zhang | H04N 19/119 |

* cited by examiner

FIG. 8
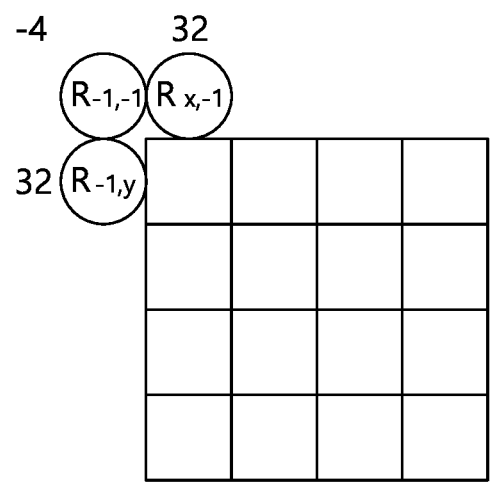
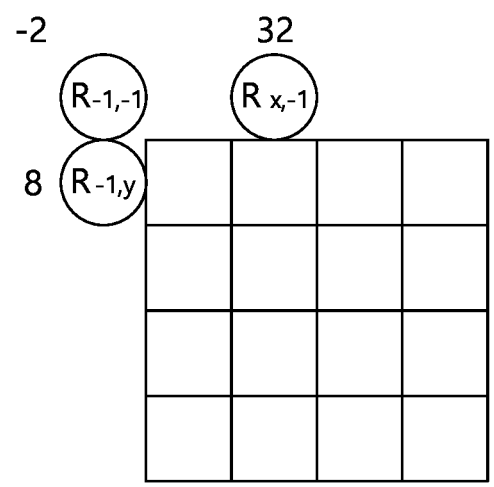

FIG. 10
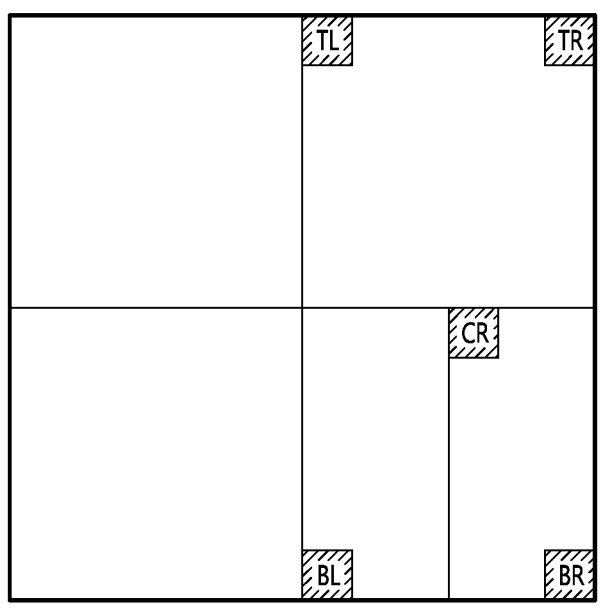
luma block
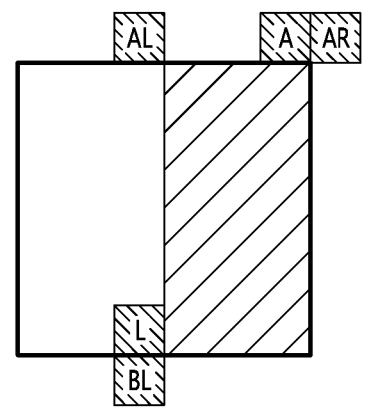
chroma block

FIG. 11
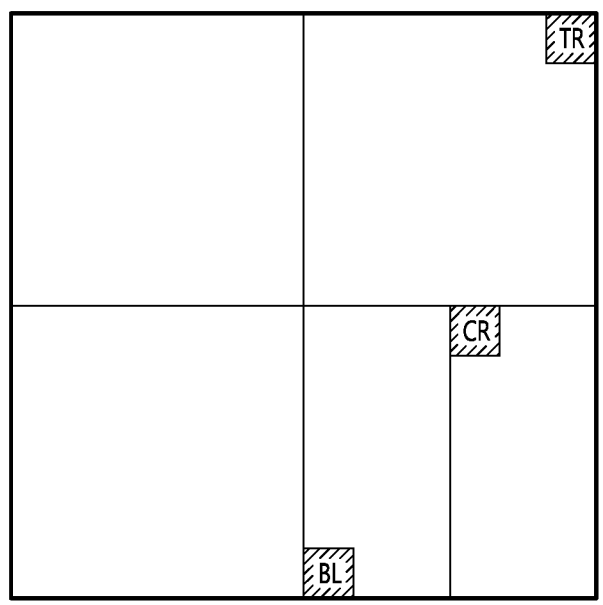
luma block
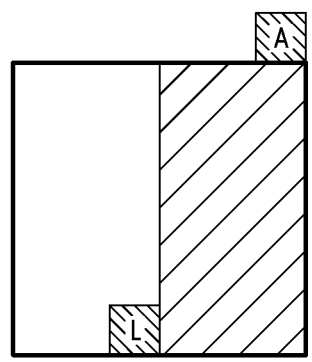
chroma block

FIG. 13
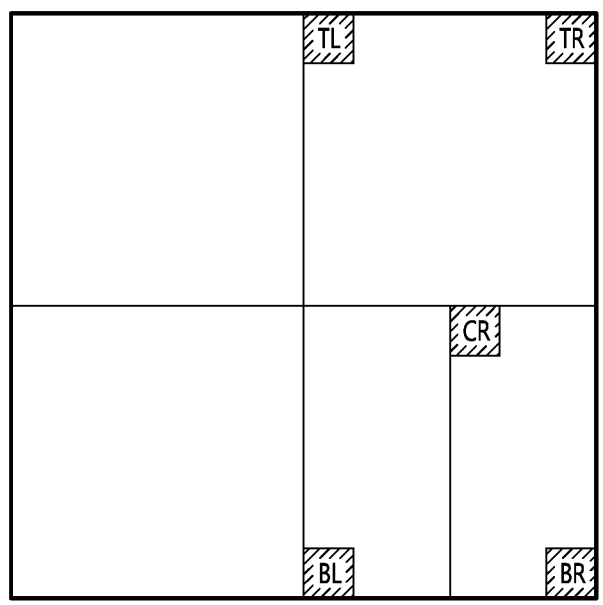
luma block
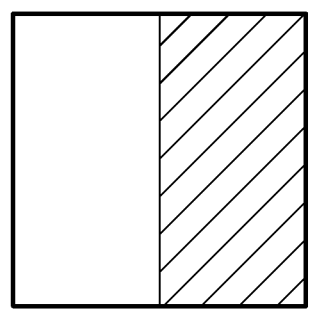
chroma block

FIG. 15
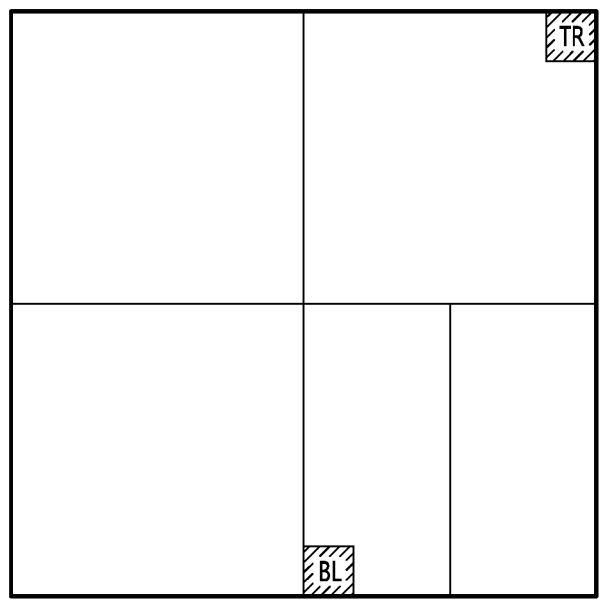
luma block
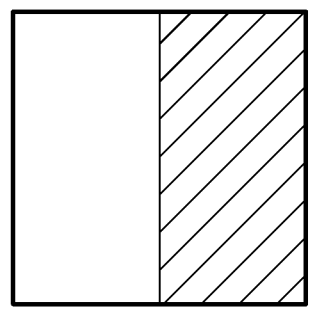
chroma block luma block　　　　　　　　　　　　chroma block luma block                chroma block FIG. 27
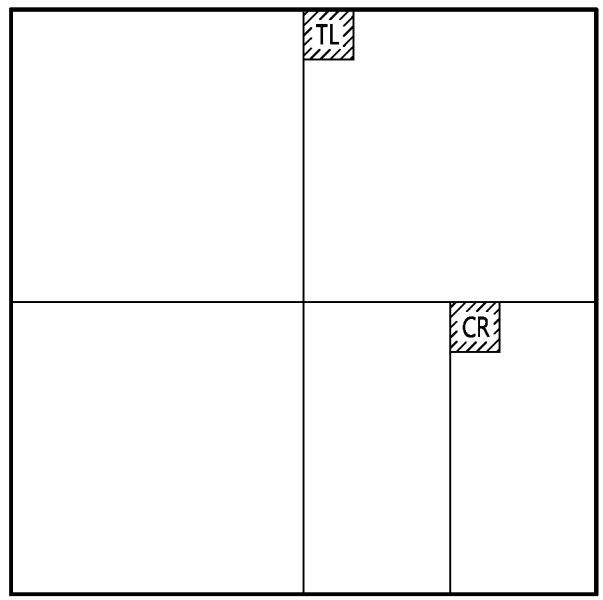
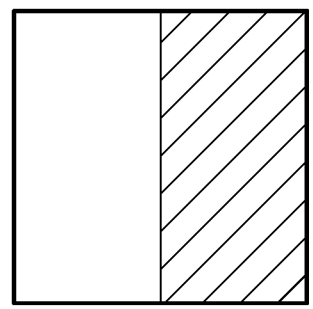
luma block                                chroma block

IMAGE PREDICTION METHOD AND DEVICE FOR DERIVING CHROMA INTRA PREDICTION MODE

CROSS-REFERENCE TO RELATED APPLICATION

This application is the National Stage filing under 35 U.S.C. 371 of International Application No. PCT/KR2019/016414, filed on Nov. 27, 2019, which claims priority to and the benefit of U.S. Provisional Application No. 62/787,737, filed on Jan. 2, 2019, and U.S. Provisional Application No. 62/775,899, filed on Dec. 5, 2018, which is incorporated herein by reference in its entirety.

BACKGROUND OF DISCLOSURE

Field of the disclosure

This document relates to an image coding technology, and more particularly, to an image decoding method and apparatus for deriving a chroma intra prediction mode in an image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The purpose of this document is to provide a method and apparatus for improving image coding efficiency.

Another purpose of this document is also to provide an effective intra prediction method and apparatus of a chroma block.

Still another purpose of this document is to provide an intra prediction method and apparatus for deriving a chroma prediction mode by using an intra prediction mode of a luma block.

Still another purpose of this document is to provide an image coding method and apparatus which are capable of increasing the precision of intra prediction.

According to an embodiment of this document, there is provided an image decoding method performed by a decoding apparatus, the method including: deriving a luma intra prediction mode for a luma block corresponding to a chroma block of a current block; generating a chroma candidate mode list for the chroma block including a predetermined number of chroma intra candidates by using at least one of a right upward diagonal mode, a HORIZONTAL mode, a VERTICAL mode, a DC mode, a PLANAR mode, and a DM derived from the luma intra prediction mode; deriving a chroma intra prediction mode for the chroma block based on chroma prediction mode information related to any one of the chroma candidate mode list; and generating a prediction sample for a chroma block based on the chroma intra prediction mode, wherein the DM is a prediction mode corresponding to a CR (center) position of the luma block, and wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM.

According to still another embodiment of this document, there is provided an image encoding method by an encoding apparatus, the method including: deriving a luma intra prediction mode for a luma block corresponding to a chroma block of a current block; generating a chroma candidate mode list for the chroma block including a predetermined number of chroma intra candidates by using at least one of a right upward diagonal mode, a HORIZONTAL mode, a VERTICAL mode, a DC mode, a PLANAR mode, and a DM derived from the luma intra prediction mode; encoding chroma prediction mode information related to any one of the chroma candidate mode list, wherein the DM is a prediction mode corresponding to a CR (center) position of the luma block, and wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM.

According to still another embodiment of this document, there is provided an image encoding apparatus, the apparatus including an entropy decoder decoding luma intra prediction mode information for a luma block of a current block and chroma intra prediction mode information for a chroma block of the current block; and a predictor which derives a luma intra prediction mode for the luma block based on the luma intra prediction mode information, generates a chroma candidate mode list for the chroma block including a predetermined number of chroma intra candidates by using at least one of a right upward diagonal mode, a HORIZONTAL mode, a VERTICAL mode, a DC mode, a PLANAR mode, and a DM derived from the luma intra prediction mode, derives a chroma intra prediction mode for the chroma block based on the chroma prediction mode information related to any one of the chroma candidate mode list, and generates a prediction sample for a chroma block based on the chroma intra prediction mode, wherein the DM is a prediction mode corresponding to a CR (center) position of the luma block, and wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM.

According to still another embodiment of this document, a digital storage medium in which image data including encoded image information generated according to the image encoding method performed by an encoding apparatus is stored may be provided.

According to still another embodiment of this document, a digital storage medium in which image data including encoded image information causing the decoding apparatus to perform the image decoding method is stored may be provided.

According to an embodiment of this document, it is possible to improve overall image/video compression efficiency.

According to an embodiment of this document, it is possible to effectively derive an effective intra prediction mode of a chroma block.

According to an embodiment of this document, it is possible to derive a chroma prediction mode by using an intra prediction mode of a luma block.

According to an embodiment of this document, an image coding method and apparatus which are capable of increasing the precision of intra prediction can be provided.

BRIEF DESCRIPTION OF THE DRAWINGS

FIG. 8 is a diagram illustrating PDPC weights in DC mode according to an embodiment of this document.

FIG. 10 is a diagram illustrating a DM that may be applied when deriving an intra prediction mode of a chroma block according to an embodiment of this document.

FIG. 11 is a diagram illustrating a DM that may be applied when deriving an intra prediction mode of a chroma block according to another embodiment of this document.

FIG. 13 is a diagram illustrating a DM that may be applied when deriving an intra prediction mode of a chroma block according to still another embodiment of this document.

FIG. 15 is a diagram illustrating a DM that may be applied when deriving an intra prediction mode of a chroma block according to still another embodiment of this document.

FIG. 27 is a diagram illustrating a DM that may be applied when deriving an intra prediction mode of a chroma block according to still another embodiment of this document.

DESCRIPTION OF EMBODIMENTS

Figure 1:
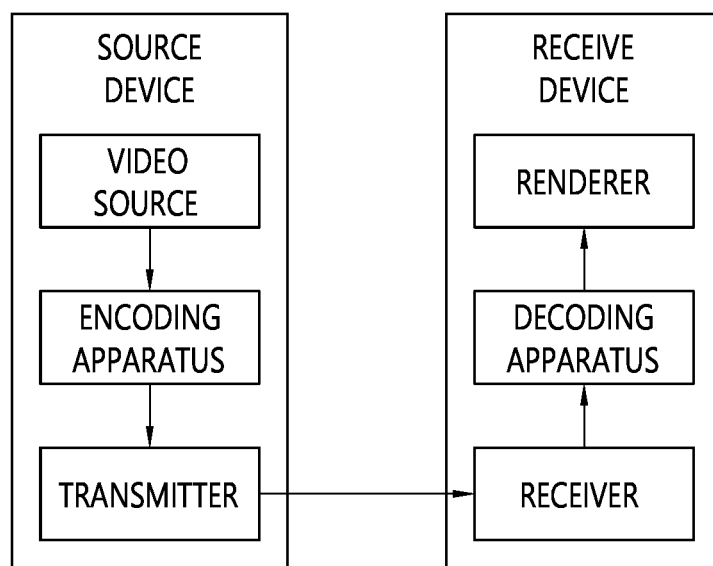
FIG. 1 schematically represents an example of a video/image coding system to which this document may be applied.

This disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, the respective structures in the drawings of this specification are provided independently from each other for the convenience of describing different characteristic functions, which, however, does not indicate that each structure should be implemented by separate hardware or separate software. For example, each structure may be implemented by a combination of two or more structures, or one structure may be split into a plurality of structures. An embodiment in which structures are integrated into one and/or separated from each other should be regarded as belonging to the scope of this specification unless it departs from the technical spirit of a method disclosed in this specification.

Hereinafter, examples of this embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which this disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of processes such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of processes such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a particular tile column and a rectangular region of CTUs within a particular tile column. The tile column is a rectangular region of CTUs, which has a height equal to the height of the picture and a width that may be specified by syntax elements in the picture parameter set. The tile row is a rectangular region of CTUs, which has a width specified by syntax elements in the picture parameter set and a height that may be equal to the height of the picture. A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture. A slice may include an integer number of bricks of a picture, and the integer number of bricks may be included in a single NAL unit. A slice may be constructed with multiple complete tiles, or may be a consecutive sequence of complete bricks of one tile. In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an MxN block may include samples (or sample arrays) or a set (or array) of transform coefficients of M columns and N rows.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C."

Additionally, in this document, the term "or" should be interpreted as "and/or." For example, the expression "A or B" may mean 1) only "A", 2) only "B", and/or 3) "both A and B." In other words, the term "or" in this document may mean "additionally or alternatively."

Figure 2:
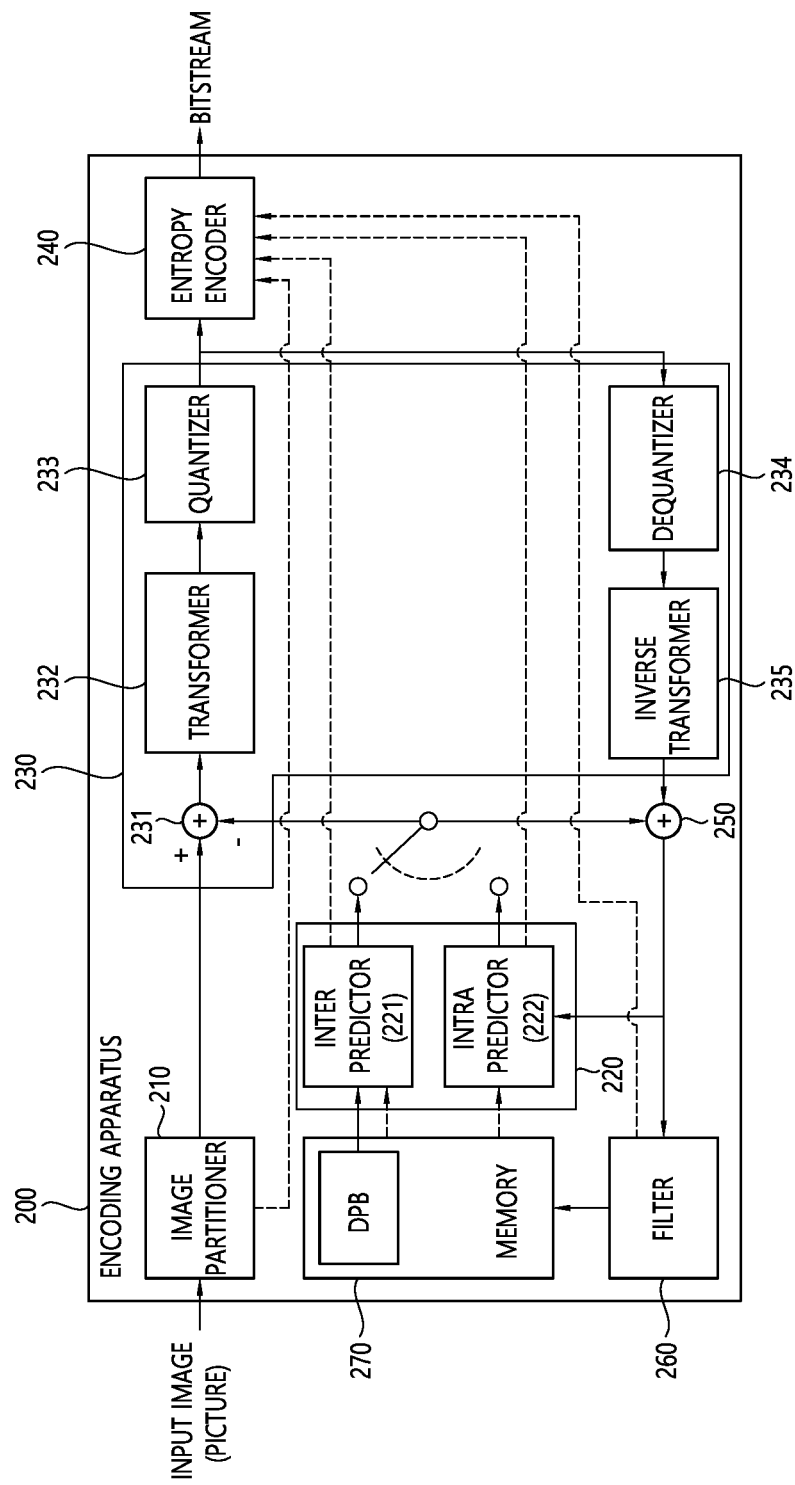
FIG. 2 is a diagram schematically illustrating a configuration of a video/image encoding apparatus to which this document may be applied.

FIG. 2 is a diagram schematically illustrating a configuration of a video/image encoding apparatus to which this document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding process according to this disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding process may include a process such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an MxN block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 221 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 221 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a PLANAR mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 221 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in this document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 231 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding process and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
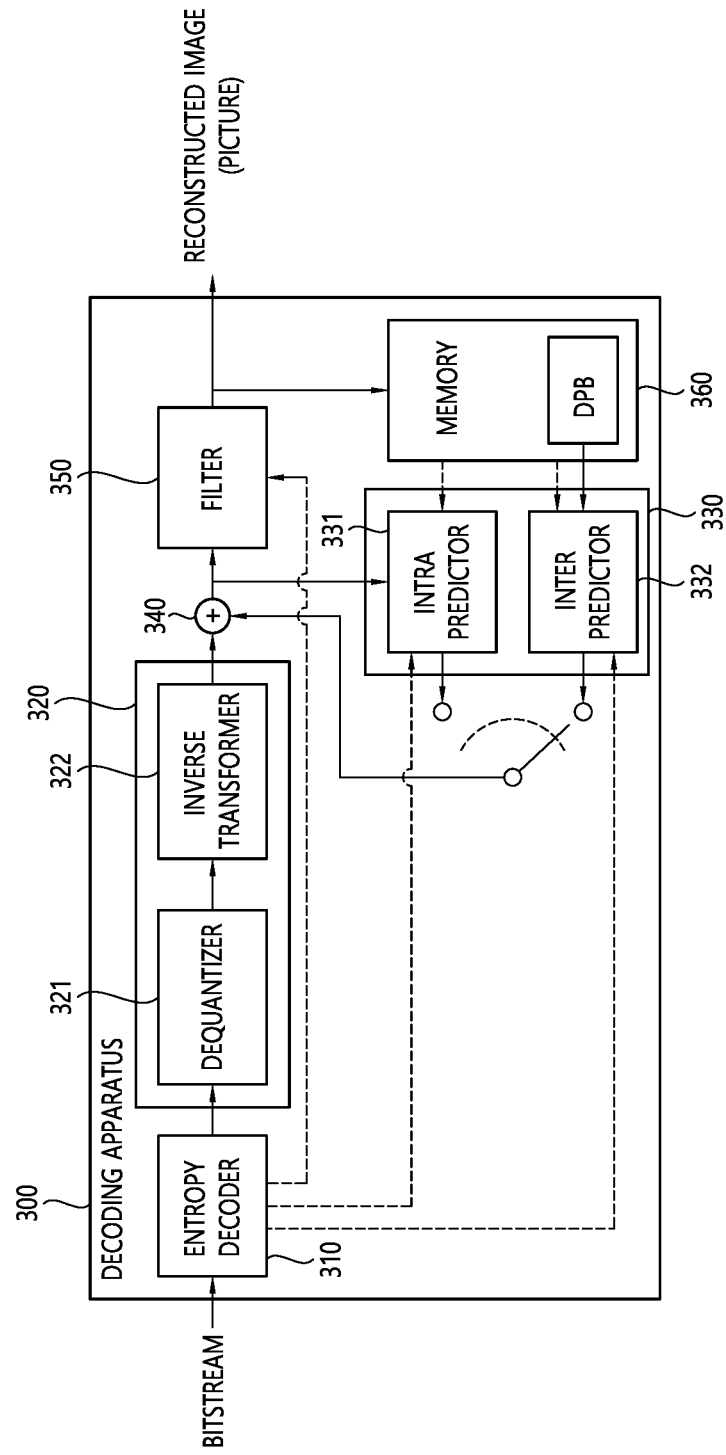
FIG. 3 is a diagram schematically illustrating a configuration of a video/image decoding apparatus to which this document may be applied.

FIG. 3 is a diagram for schematically explaining a configuration of a video/image decoding apparatus to which this disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding process and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor 330 may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in this document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In this specification, the exemplary embodiments described in the filter 260, the inter predictor 221, and the intra predictor 221 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization process. For example, the encoding apparatus may derive a residual block between the original block and the predicted block, perform a transform process on residual samples (residual sample array) included in the residual block to derive transform coefficients, perform a quantization process on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform process based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
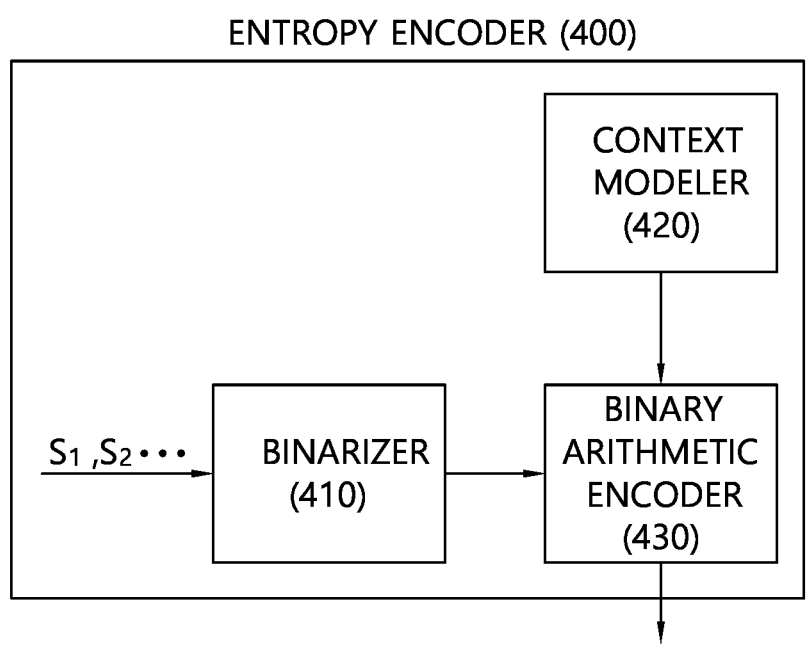
FIG. 4 is a diagram illustrating an entropy encoder according to an embodiment of this document.

FIG. 4 is a diagram illustrating an entropy encoder according to an embodiment of this document.

As shown, the entropy encoder 400 includes a binarizer 410, a context modeler 420, and a binary arithmetic encoder 430.

The binarizer 410 may receive a sequence of data symbols and perform binarization to output a binary symbol (bin) string consisting of 0 or 1 binary values. The binarizer 410 may map syntax elements to binary symbols. Different binarization processes, such as unary (U), truncated unary (TU), k-th Exp-Golomb (EGk), and a fixed length process may be used for binarization. The binarization process may be selected based on a type of the syntax element.

The output binary symbol string is transmitted to the context modeler 420. The context modeler 420 performs a probability evaluation on entropy-encoding. That is, the context modeler 420 may evaluate a probability of the bins.

The context modeler 420 may provide an accurate probability estimation required for achieving high coding efficiency. Thus, different context models may be used for different binary symbols and a probability of this context model may be updated based on the values of previously coded binary symbols.

Binary symbols having a similar distribution may share the same context model. The context model for each of these binary symbols may be selected based on at least one of a type of the syntax element, a position (binIdx) of the binary symbol in the syntax element, luminance/chrominance (luma/chroma), and adjacent information.

The binary arithmetic encoder 430 performs entropy-encoding on the output string and outputs compressed data bits.

The binary arithmetic encoder 430 performs arithmetic coding based on a recursive interval division.

A section (or range) having an initial value of 0 to 1 is divided into two sub-sections based on the probability of the binary symbol. The encoded bits provide an offset to select one of the two sub-sections related to values of the decoded binary symbols when transformed to binary fractional numbers.

After the binary symbol of the decoded mode, the section may be updated to make the selected sub-section uniform, and the section dividing process itself is repeated. The section and offset have limited bit precision, so renormalization may be required to prevent overflow whenever the section falls below a certain value. The renormalization may occur after each binary symbol is decoded.

Arithmetic coding may be performed using an estimated probability or assuming the same probability of 0.5. To bypass the coded binary symbols, dividing the range into sub-sections may be performed through a shift operation, whereas a look-up table may be needed for context-coded binary symbols.

The reverse process proceeded in the entropy encoder of FIG. 4 may be performed by the entropy decoder of the image decoding apparatus.

Figure 5:
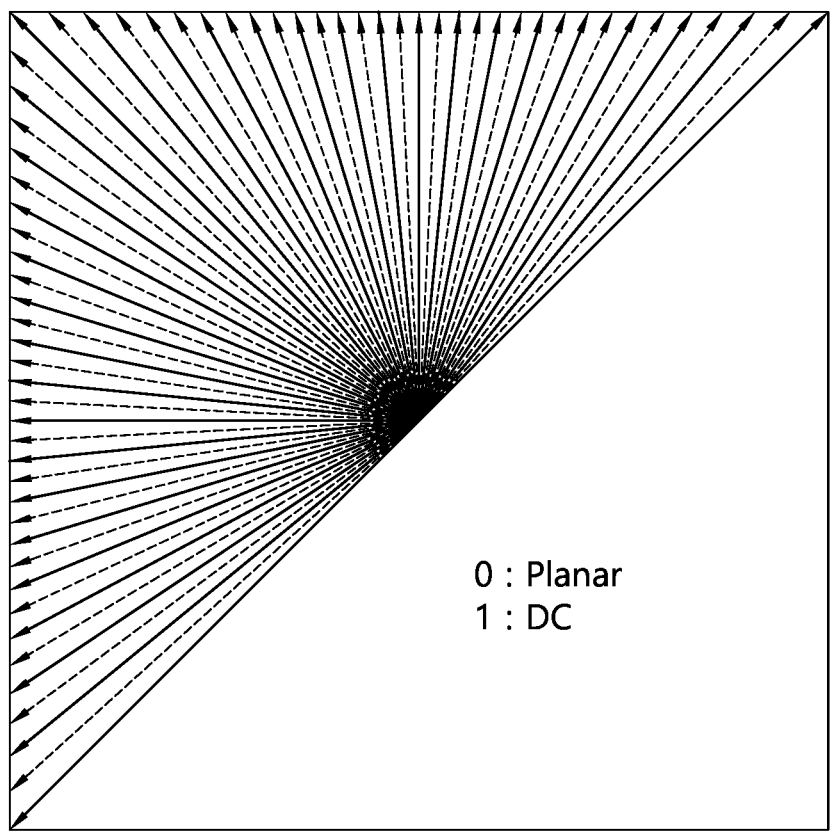
FIG. 5 is a diagram illustrating 67 intra prediction modes according to an embodiment of this document.

FIG. 5 is a diagram illustrating 67 intra prediction modes according to an embodiment of this document.

In intra prediction according to an embodiment of this document, 67 intra prediction modes as shown in FIG. 5 and Table 1 may be used.

TABLE 1

| Intra prediction mode | Associated name |
| --- | --- |
| 0 | intra PLANAR (INTRA_PLANAR) |
| 1 | intra DC (INTRA_DC) |
| 2 ... 66 | Intra angular 2 ... intra angular 66 (INTRA_ANGULAR 2 ... INTRA_ANGULAR 66) |

This is an extension of the existing 35 angular modes to 67 angular modes for intra-encoding and more accurate prediction of high-resolution image. Arrows represented by dotted lines in FIG. 5 indicate 32 newly added angular modes in the 35 angular modes. The intra PLANAR (INTRA_PLANAR) mode and the intra DC (INTRA_DC) mode are the same as the existing intra PLANAR mode and the existing intra DC mode. The added 32 angular modes may be applied to all block sizes, and may be applied to both intra encoding and decoding of the luminance (luma) component and the chrominance (chroma) component.

Referring to FIG. 5, intra prediction mode 2 may represent a left downward diagonal direction, 34 may represent a left upward diagonal direction, and 66 may represent a right upward diagonal direction. In FIG. 5, a VERTICAL direction may be indicated with an intra prediction mode 50 and a HORIZONTAL direction may be indicated with an intra prediction mode 18.

Figure 6:
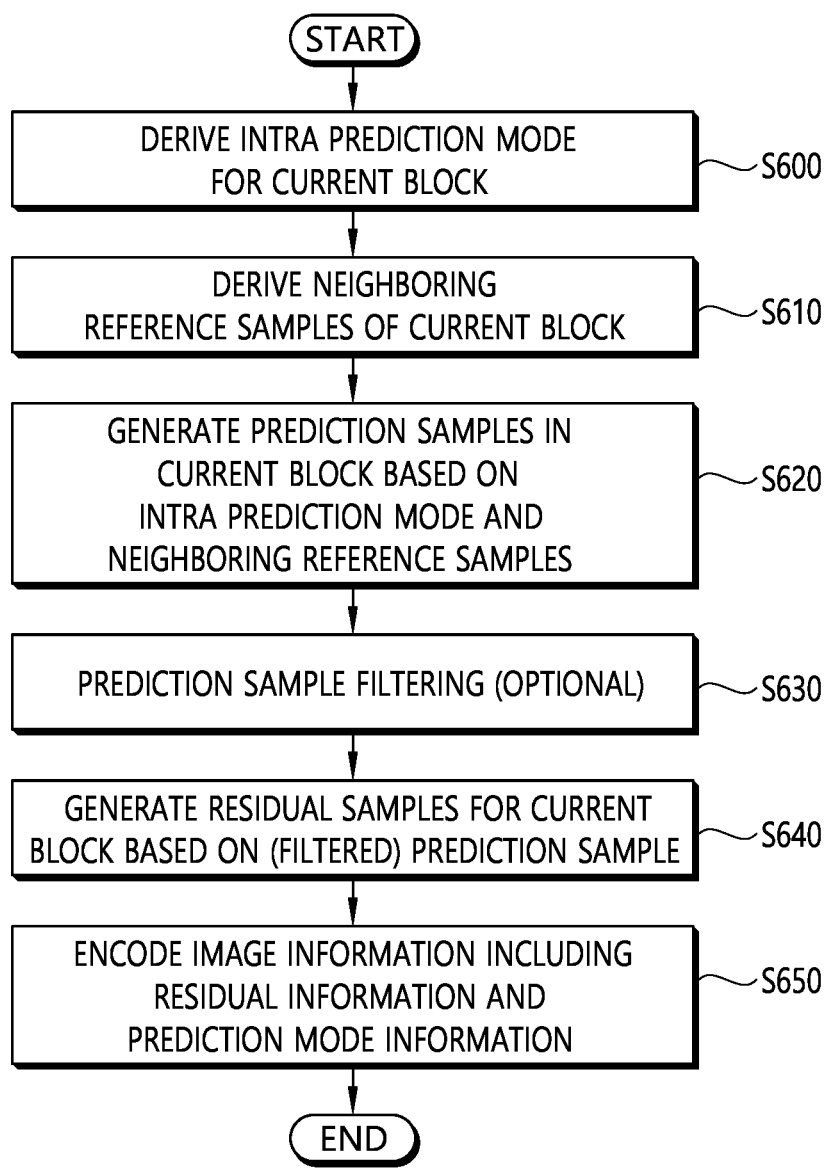
FIG. 6 is a control flowchart illustrating an encoding method that may be applied in the intra prediction according to an embodiment of this document.
Figure 7:
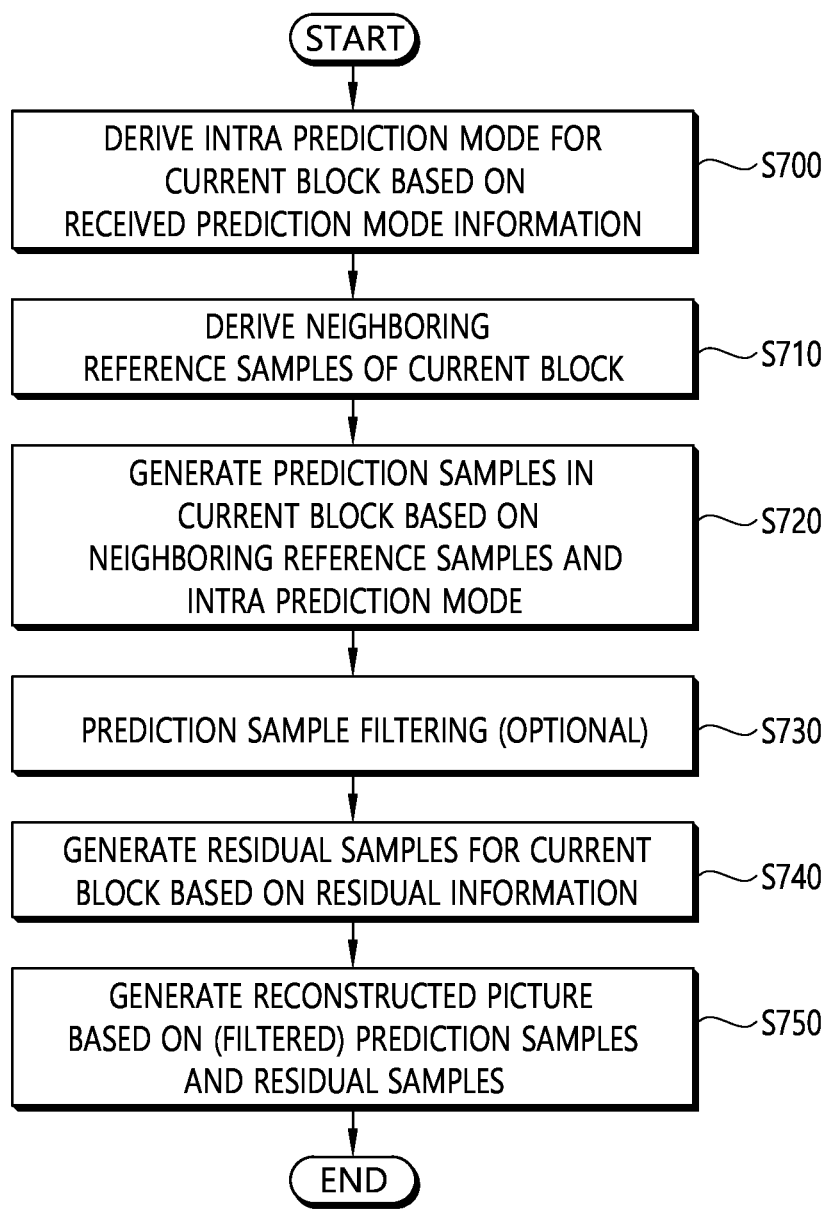
FIG. 7 is a control flowchart illustrating a decoding method that may be applied in the intra prediction according to an embodiment of this document.

FIG. 6 is a control flowchart illustrating an encoding method that may be applied in the intra prediction according to an embodiment of this document, and FIG. 7 is a control flowchart illustrating a decoding method that may be applied in the intra prediction according to an embodiment of this document.

According to FIG. 6, the encoding apparatus may derive an intra prediction mode for a current block (S600), and derive neighboring reference samples of the current block (S610).

The encoding apparatus generates prediction samples within the current block based on the intra prediction mode and the neighboring reference samples (S620).

In this case, the encoding apparatus may perform a prediction sample filtering process (S630). The prediction sample filtering may be referred to as post filtering. Some or all of the prediction samples may be filtered by the prediction sample filtering process. In some cases, S630 process may be omitted.

The encoding apparatus generates residual samples for the current block based on the (filtered) prediction sample (S640).

The encoding apparatus may encode image information including prediction mode information related to the intra prediction mode and residual information on the residual samples (S650).

The encoded image information may be output in the form of a bitstream. The output bitstream may be delivered to the decoding apparatus through a storage medium or a network.

The decoding apparatus may perform an operation corresponding to the operation which has been performed in the encoding apparatus. The decoding apparatus may derive an intra prediction mode for the current block based on the received prediction mode information (S700).

The decoding apparatus may derive neighboring reference samples of the current block (S710).

The decoding apparatus generates prediction samples within the current block based on the intra prediction mode and the neighboring reference samples (S720).

In this case, the decoding apparatus may perform a prediction sample filtering process (S730). The prediction sample filtering may be referred to as post filtering. Some or all of the prediction samples may be filtered by the prediction sample filtering process. In some cases, S730 process may be omitted.

The decoding apparatus generates the residual samples for the current block based on the received residual information (S740).

The decoding apparatus may generate reconstructed samples for the current block based on the (filtered) prediction samples and the residual samples, and generate a reconstructed picture based on these reconstructed samples (S750).

Meanwhile, the PDPC (Position dependent intra prediction) of the intra prediction modes may be an intra prediction method of deriving filtered reference samples by performing filtering based on the filter for the PDPC, of deriving a temporary prediction sample of the current block based on the intra prediction mode of the current block and the filtered reference samples, and of deriving a prediction sample of the current block by weighted summing the at least one reference sample of the existing reference samples, i.e., unfiltered reference samples, which is derived according to the intra prediction mode, and the temporary prediction sample.

Here, the predefined filter may be one of five 7-tap filters. Alternatively, the predefined filter may be one of a 3-tap filter, a 5-tap filter, and a 7-tap filter. The 3-tap filter, the 5-tap filter, and the 7-tap filter may represent a filter having three filter coefficients, a filter having five filter coefficients, and a filter having seven filter coefficients, respectively.

Meanwhile, the PDPC may be applied to the PLANAR mode, the DC mode, the VERTICAL mode, and the HORIZONTAL mode without signaling. The prediction sample P(x,y) located at (x, y) of the current block may be calculated as in Equation 1 below.

$$P(x,y)=(wL \times R\_(-1,y)+wT \times R\_(x,-1)+wTL \times R\_(-1,-1)+(64-wL-wT-wTL) \times P(x,y)+32)>>6 \quad \text{[Equation 1]}$$

In Equation 1, R(x,−1) and R(−1,y) denote reference samples located at the top and the left of the current sample (x, y), and R(−1,−1) denotes a reference sample located at the top-left of the current block.

The DC mode weight may be calculated as in Equation 2 below.

$$wT=32>>((y<<1)>>\text{shift}),$$

$$wT=32>>((x<<1)>>\text{shift}),$$

$$wTL=-(wL>>4)-(wT>>4) \quad \text{[Equation 2]}$$

The shift in Equation 2 may be calculated as in Equation 3.

$$\text{shift}=(\log\_2\text{⌊}(\text{width})+\log\_2\text{⌊}(\text{height})+2\text{⌋})>>2 \quad \text{[Equation 3]}$$

In the HORIZONTAL mode, wTL is set to wT, and in the VERTICAL mode, wTL is the same as wL, whereas in the PLANAR mode, wTL is set to 0.

FIG. 8 is a diagram illustrating PDPC weights in DC mode according to an embodiment of this document.

As shown, FIG. 8 shows PDPC weights for positions (0, 0) and (1, 0) in one 4×4 block.

Figure 9:
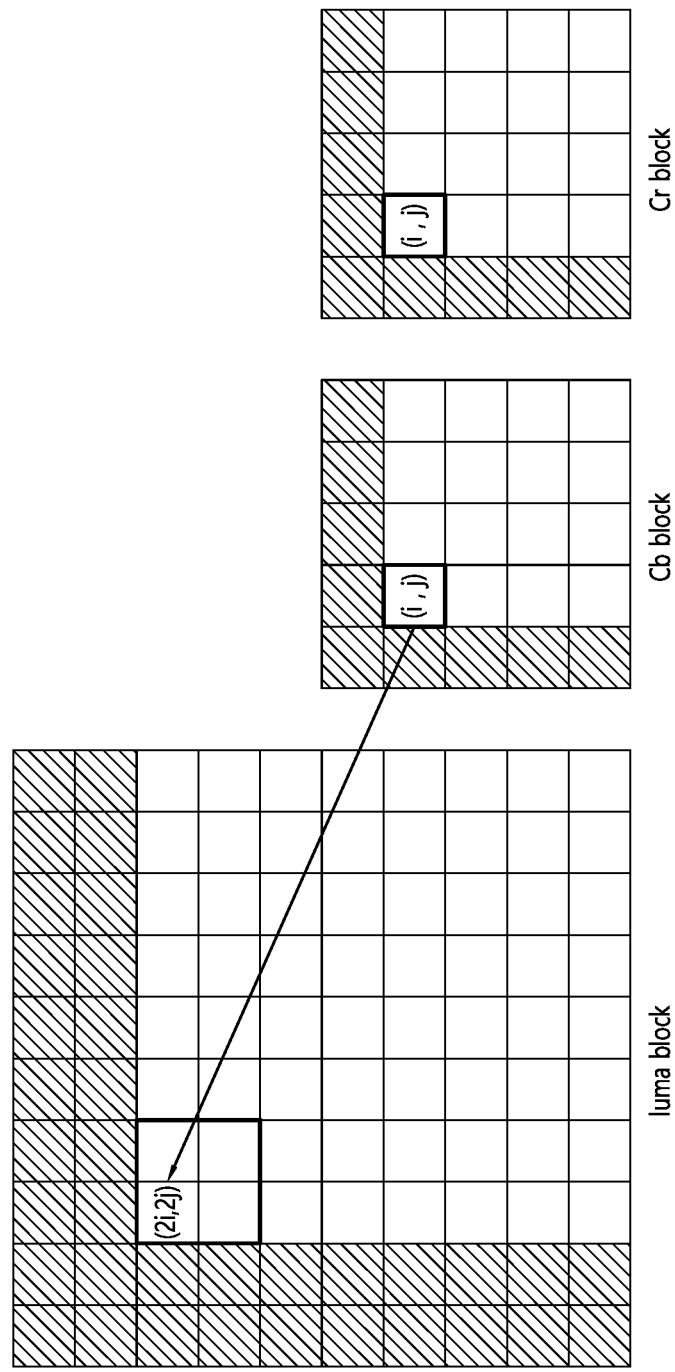
FIG. 9 is a diagram illustrating a CCLM according to an embodiment of this document.

FIG. 9 is a diagram illustrating a CCLM according to an embodiment of this document.

When intra encoding a chrominance image composed of a chrominance signal (chroma component) during the intra prediction mode, a cross-component linear model (CCLM) is used as one of the prediction modes. CCLM is a method of predicting pixel values of a chrominance image from pixel values of a reconstructed luminance image, and is a method based on a characteristic that a correlation between a luminance image and a chrominance image is high.

The CCLM prediction of the Cb and Cr chrominance images is obtained through Equation 4.

$$\text{pred}_C(i,j)=\alpha \cdot \text{recon}_L(2i, 2j)+\beta \quad \text{[Equation 4]}$$

In Equation 4, predC(i,j) denotes a Cb or Cr chrominance image to be predicted, reconL(2i,2j) denotes a reconstructed luminance image, and (i,j) denotes a pixel coordinate.

In 4:2:0 color format, since a size of luminance image is double of that of a chrominance, it should be considered, and accordingly, a pixel of luminance image to be used in chrominance image predc (i, j) may be used in consideration of all neighboring pixels in addition to reconL(2i,2j). α and β are calculated through the difference of the average value and cross-correlation between the luminance block neighboring template and the Cb or Cr chrominance block neighboring template as in the hatched region of FIG. 9.

The CCLM method of the Joint Exploration Test Model (JEM) used in the standardization meeting currently being discussed, that is, the Joint Video Exploration Team (JVET), may be classified into LM, multi-model LM (MMLM), and multi-filter LM (MFLM).

The MMLM method is a prediction method in which a luminance pixel value corresponding to a chrominance pixel is calculated through various filters other than the basic filter used in LM.

The MFLM method classifies α and β in Equation 4 into several groups according to pixel values, adaptively applies α and β matching for the corresponding group and use them in chrominance pixel prediction.

FIG. 10 is a diagram illustrating a DM that may be applied when deriving an intra prediction mode of a chroma block according to an embodiment of this document.

Among the standards for image coding, HEVC uses a direct mode (DM) as one of the prediction modes when the intra encoding of a chrominance image is performed. The DM may be defined as a prediction mode in which the intra prediction direction of the luminance block at the same position as the current chrominance block is used as it is. Alternatively, in another embodiment, it may be defined as a non-LM mode or a non-CCLN mode among the chroma intra prediction modes. In this specification, in order to derive a chroma intra mode, an intra prediction mode of a luma block (luminance block) may be directly used, or a chroma intra prediction mode that may be derived using or from the luma mode may be referred to as the DM.

In JEM (Joint Explotation Test Model) used in JVET (Joint Video Exploration Team), a DM mode, which is the existing single mode, is extended to multiple modes and used.

That is, when constructing an intra prediction mode of a chrominance image, a prediction mode of a block covering a location shown in FIG. 10 may be selected as a plurality of DM modes and used for intra prediction. With the plurality of DMs of the luma block, using one selected DM from among them as a candidate of the intra prediction mode of the chroma block may be referred to as multiple DM signaling (MDMS).

The process for deriving the DM mode may be as follows.

(1) Intra prediction modes at the CR (center), TL (top left), TR (top right), BL (bottom left), and BR (bottom right) positions of the luminance block at the same position as the chrominance block (2) Intra prediction modes of the L (left), A (above), BL, AR (above right), and AL (above left) blocks which are neighboring blocks of the current chrominance block (3) Planner mode, DC mode (4) −1 or +1 angular mode to the previously selected angular mode (5) VERTICAL mode, HORIZONTAL mode, Nos. 2, 34, 66, 10, and 26 modes (6) If five prediction modes are not selected through the above processes, the previously selected mode may be copied and selected.

In the process of (4), if there are a plurality of angular modes, −1 or +1 angular mode to the first directional mode is selected, and then −1 or +1 angular mode to the second angular mode may be selected. In this way, −1 or +1 angular mode is sequentially selected for a plurality of directional modes, and finally, through the process of (6), five prediction modes may be selected as candidate modes.

Nos. 10 and 26 modes that may be selected in the process of (5) correspond to prediction mode numbers when there are 67 intra prediction modes.

The DMs selected through the processes (1) to (6) may be encoded through binarization as shown in Table 2, and the mode selected through encoding in the encoding apparatus is transmitted to the decoding apparatus through context modeling.

TABLE 2

| Chroma mode | Context model 0 | Context model 1 | Context model 2 | Context model 3 | Context model 4 |
|---|---|---|---|---|---|
| Mode0 | 0 | | | | |
| Mode1 | 1 | 0 | | | |
| Mode2 | 1 | 1 | 0 | | |
| Mode3 | 1 | 1 | 1 | 0 | |
| Mode4 | 1 | 1 | 1 | 1 | 0 |

Meanwhile, as in FIG. 10 and Table 2, the MDMS may have a problem of increasing the complexity of hardware implementation.

Hereinafter, embodiments propose a method of addressing a hardware implementation complexity problem that occurs during chrominance intra prediction (chroma intra prediction). To this end, a method of optimizing the mode candidate selection position when selecting chrominance prediction mode (chroma intra prediction mode) is proposed, and a method of optimizing context modeling used when encoding/decoding chrominance mode is also proposed.

FIG. 11 is a diagram illustrating a DM that may be applied when deriving an intra prediction mode of a chroma block according to another embodiment of this document.

This embodiment proposes a method of minimizing the reduction in coding efficiency while at the same time reducing the hardware implementation complexity of the MDMS by optimizing the selection positions and number of prediction mode candidates when using the MDMS of FIG. 10.

The MDMS according to an example searches for 10 mode candidate selection positions as shown in FIG. 10 and then selects 5 chrominance intra prediction modes on a first come, first served basis. To this end, a mode pruning check is performed for the prevention of the repeated selection of same mode at ten candidate selection positions, which greatly affects a cycle delay in hardware implementation. Here, the hardware cycle is the number of the next algorithms in which the previously determined information is used as the algorithm proceeds. As an example, in a case where modes are selected from 10 candidate selection positions, a total of 10 hardware cycles are required.

In VTM2.0, which is the current VVC standard software, when constructing the intra prediction mode of a chrominance image, it consists of one DM mode and four basic modes (PLANAR mode, DC mode, VERTICAL mode, and HORIZONTAL mode) like HEVC. Therefore, in VTM2.0, when constructing the intra prediction mode of the current chrominance block (chroma block), the DM mode is selected through searching one mode candidate selection position, so when implementing hardware, 4 mode pruning checks per a cycle are performed.

However, in MDMS, 10 mode candidate selection positions must be searched for in sequence when constructing the intra prediction mode of the current chrominance block, so a maximum of 10 cycles are required, and mode pruning checks must be performed within each cycle. Therefore, it is essential to reduce the hardware implementation complexity of MDMS in the intra prediction mode that is sensitive to hardware cycle delay.

This embodiment is provided to alleviate the drawback of cycle delay in hardware implementation by adjusting the prediction mode candidate selection position and the number of mode candidates when using the MDMS.

FIG. 11 shows chrominance intra prediction mode selection positions proposed in this embodiment. That is, unlike the method of searching all ten selection positions as shown in FIG. 10, a position of a high probability of being a mode close to the intra prediction mode of the current chrominance block is selectively selected. In the example of FIG. 11, the BL, AR, and AL positions are omitted based on that the positions L and A, which are positions used for 6 most probable mode (MPM) positions of the luminance block intra prediction and the Advanced Motion Vector Prediction (AMVP) of the inter prediction are selected with the highest probability, and also in the DM position (the luminance block position at the same position as the current chrominance block), only the BL, TR, and CR positions that have the most influence on the current chrominance block were considered. When using five selection positions as above, it is possible to minimize the reduction in coding efficiency while simultaneously reducing the cycle delay in hardware implementation by half.

In this embodiment according to FIG. 11, five prediction modes are selected without the repeated selection of same mode on a first come, first served basis through the following order.

Figure 12:
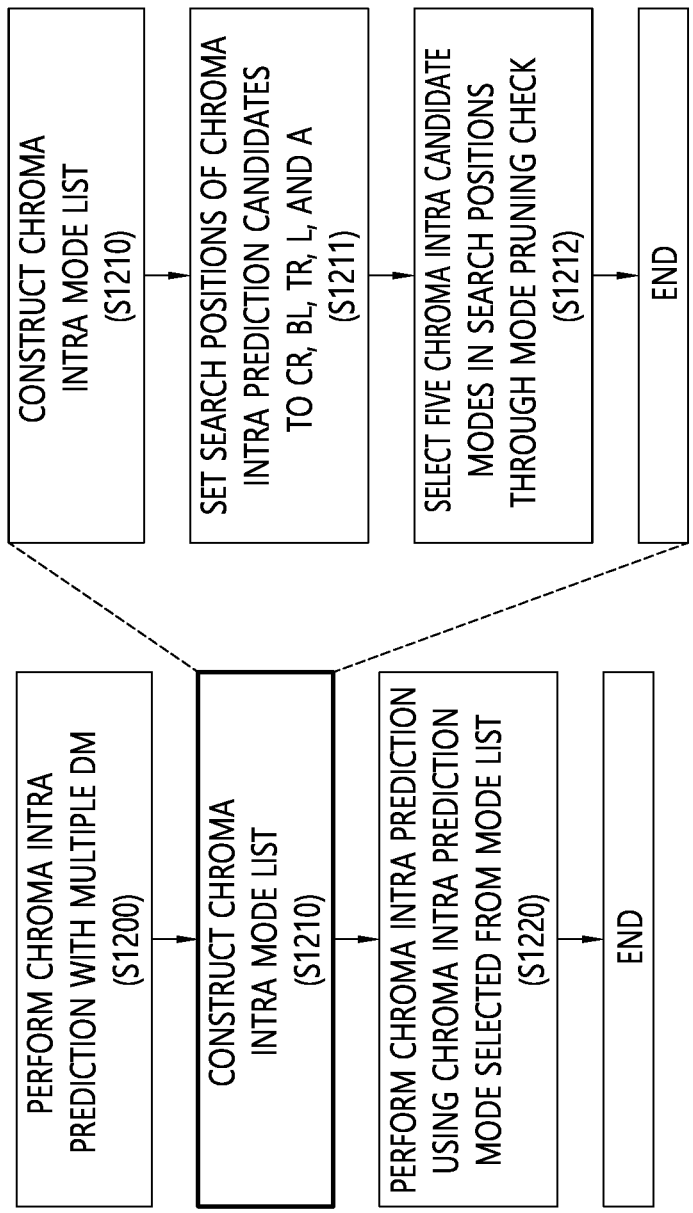
FIG. 12 is a control flowchart illustrating a deriving method according to an embodiment for the chroma intra prediction mode selection position of FIG. 11.

(1) DM: In order of CR, BL, and TR positions of the co-located luminance block, selecting an intra prediction mode corresponding to each position as an intra prediction mode of a chrominance image (2) In order of the L and A blocks, which are current chrominance block neighboring blocks, selecting a corresponding intra prediction mode as an intra prediction mode of a chrominance image (3) Selecting the PLANAR mode and the DC mode as intra prediction modes of a chrominance image (4) Selecting −1 and +1 angular modes to the previously selected angular mode as intra prediction modes of a chrominance image (5) Selecting VERTICAL mode, HORIZONTAL mode, Nos. 2, 34, 66, 10, and 26 modes as intra prediction modes of a chrominance image FIG. 12 is a control flowchart illustrating a deriving method according to an embodiment for the chroma intra prediction mode selection position of FIG. 11.

First, chroma intra prediction may be performed using a plurality of DMs (S1200). That is, S1200 is a step of deriving a DM for chroma intra prediction by using a plurality of DMs.

Thereafter, the chroma intra mode list, that is, a chroma candidate mode list, may be constructed (S1210), and chroma intra prediction may be performed using a chroma intra prediction mode selected from the mode list (S1220).

If the step of constructing the chroma intra mode list is described more specifically, the search positions of the chroma intra prediction candidates are set to CR, BL, TR, L, and A (S1211).

Thereafter, five chroma intra candidate modes are selected from the search positions through a mode pruning check (S1212).

FIG. 13 is a diagram illustrating a DM that may be applied when deriving an intra prediction mode of a chroma block according to still another embodiment of this document.

According to this embodiment, as shown in FIG. 13, the intra prediction mode of the chrominance block may be constructed under the consideration of only five selection positions of the DM positions for the luminance block. For the intra prediction mode of the chrominance block, encoding efficiency is higher when referring to the intra prediction mode at the DM position (the luminance block position at the same position as the current chrominance block) than when referring to the intra prediction mode (L, A and the like in FIG. 12) of the coded block neighboring the current chrominance block. Therefore, by constructing the intra prediction mode of the chrominance image by considering only the five positions of the DM positions, it is possible to minimize the reduction in coding efficiency while simultaneously reducing the cycle delay in hardware implementation by half.

The intra prediction mode for the chroma block according to the embodiment of FIG. 13 is selected from five prediction modes except the repeated modes on a first come, first served basis through the following order.

(1) DM (direct mode) mode: In order of CR, TL, TR, BL, and BR positions of the co-located luminance block, selecting an intra prediction mode corresponding to each position as an intra prediction mode of a chrominance image (2) Selecting the PLANAR mode and the DC mode as intra prediction modes of a chrominance image (3) Selecting −1 and +1 angular modes to the previously selected angular mode as intra prediction modes of a chrominance image (4) Selecting VERTICAL mode, HORIZONTAL mode, Nos. 2, 34, 66, 10, and 26 modes as intra prediction modes of a chrominance image FIG. 14 is a control flowchart illustrating a deriving method according to an embodiment for the chroma intra prediction mode selection position of FIG. 13.

Figure 14:
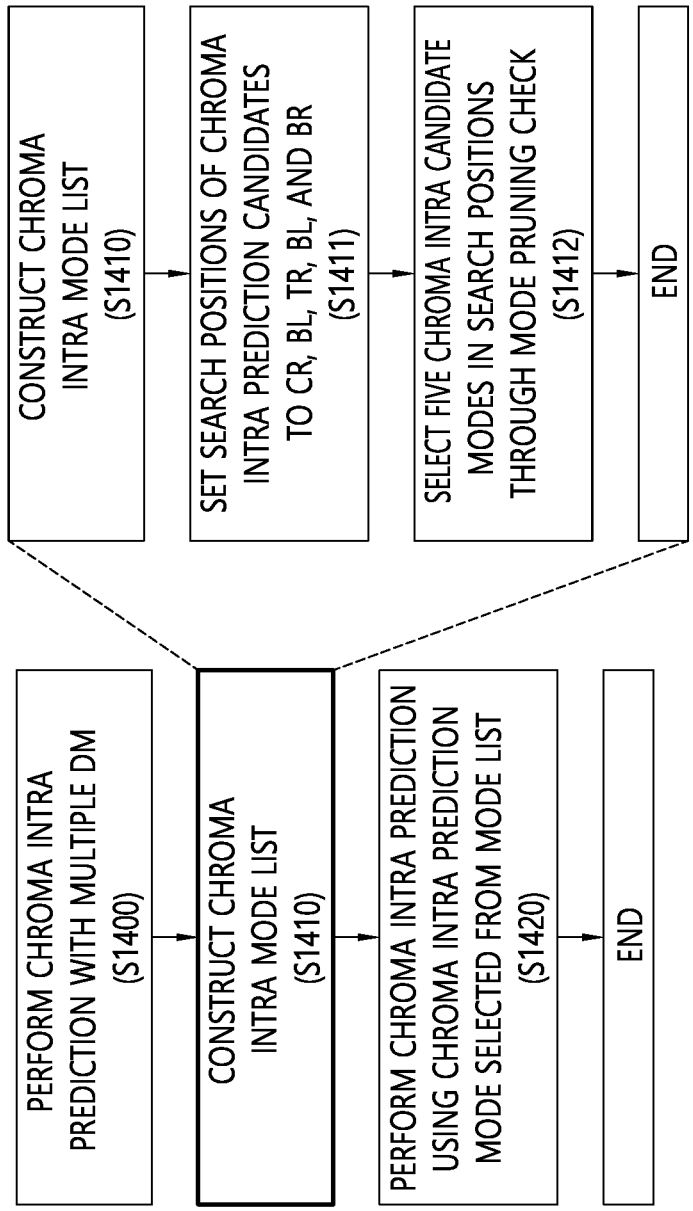
FIG. 14 is a control flowchart illustrating a deriving method according to an embodiment for the chroma intra prediction mode selection position of FIG. 13.

In the step of constructing a chroma intra mode list according to FIG. 14 (S1410), first, the search position of a chroma intra prediction candidate is set to CR, BL, TR, BL, and BR (S1411).

Thereafter, five chroma intra candidate modes are selected from the search positions through a mode pruning check (S1412).

FIG. 15 is a diagram illustrating a DM that may be applied when deriving an intra prediction mode of a chroma block according to still another embodiment of this document.

According to this embodiment, the number of intra prediction modes of a chrominance image may be reduced from five to three, and through this, it is possible to simply determine an intra prediction mode candidate.

As shown in FIG. 15, three intra prediction modes of a chrominance image are selected under the consideration of only the BL and TR positions of the DM mode position. As described above, when constructing the intra prediction mode of the current chrominance block, considering the intra-prediction mode at the DM position has a higher coding efficiency than considering the intra-prediction mode neighboring the chrominance block, and in order to predict the intra prediction mode of the current block, considering the BL and TR positions as considered in 6 MPMs and the AMVP may increase prediction accuracy.

Therefore, in this embodiment, by deriving a chroma intra prediction mode by considering only the DM position and the BL and TR within the DM position, it is possible to minimize the reduction in coding efficiency while at the same time minimizing the hardware cycle delay. The process of determining an intra prediction mode of three chrominance images after viewing only the BL and TR positions according to the embodiment of FIG. 15 is as follows.

(1) When the intra prediction modes of BL and TR positions are the same, and both modes are the DC mode or PLANAR mode: Selecting the PLANAR mode, the DC mode and the VERTICAL mode in this order (2) When the intra prediction modes of BL and TR positions are the same, and both modes are neither the DC mode nor the PLANAR mode: Selecting the BL mode, the BL−1 mode, and the BL+1 mode in this order (3) When the intra prediction modes of BL and TR positions are different from each other: Selecting three modes on a first come, first served basis without the repeated selection of same mode in order of the BL, the TR, the PLANAR mode, the DC mode and the VERTICAL mode When selecting the intra prediction mode for the chroma mode as in this embodiment, only 2 cycles and 2 mode pruning checks are required for implementing hardware, so it has almost the same hardware implementation complexity as when MDMS is not used, and there is an advantage that the coding time is also reduced because the number of chrominance intra prediction modes has been reduced from five to three.

Table 3 shows the experimental results of the example of FIG. 15.

TABLE 3

| | Over VTM-1.5 | | | | |
|---|---|---|---|---|---|
| | Y | U | V | EncT | DecT |
| Class A1 | −0.06% | −0.15% | −0.46% | 93% | 102% |
| Class A2 | −0.15% | −0.18% | −0.19% | 92% | 100% |
| Class B | −0.13% | −0.44% | −0.43% | 94% | 100% |
| Class C | −0.09% | −0.23% | −0.09% | 94% | 99% |
| Class E | −0.18% | −1.34% | −1.08% | 94% | 100% |
| Overall | −0.12% | −0.45% | −0.43% | 94% | 100% |
| Class D | −0.08% | 0.12% | 0.01% | 94% | 99% |

The experimental anchor in Table 3 is VTM1.5 (VTM1.0+PDPC+luma/chroma separate tree+CCLM), and experimental results are for all intra frame (all intra full frame). When constructing the chrominance intra prediction mode as in FIG. 15, coding gains of Y 0.12%, Cb 0.45%, and Cr 0.43% can be obtained in the situation where the hardware implementation complexity is almost the same as the method of generating the chrominance block intra prediction mode in the existing HEVC and VTM, and the coding complexity can also be reduced to 94%.

Figure 16:
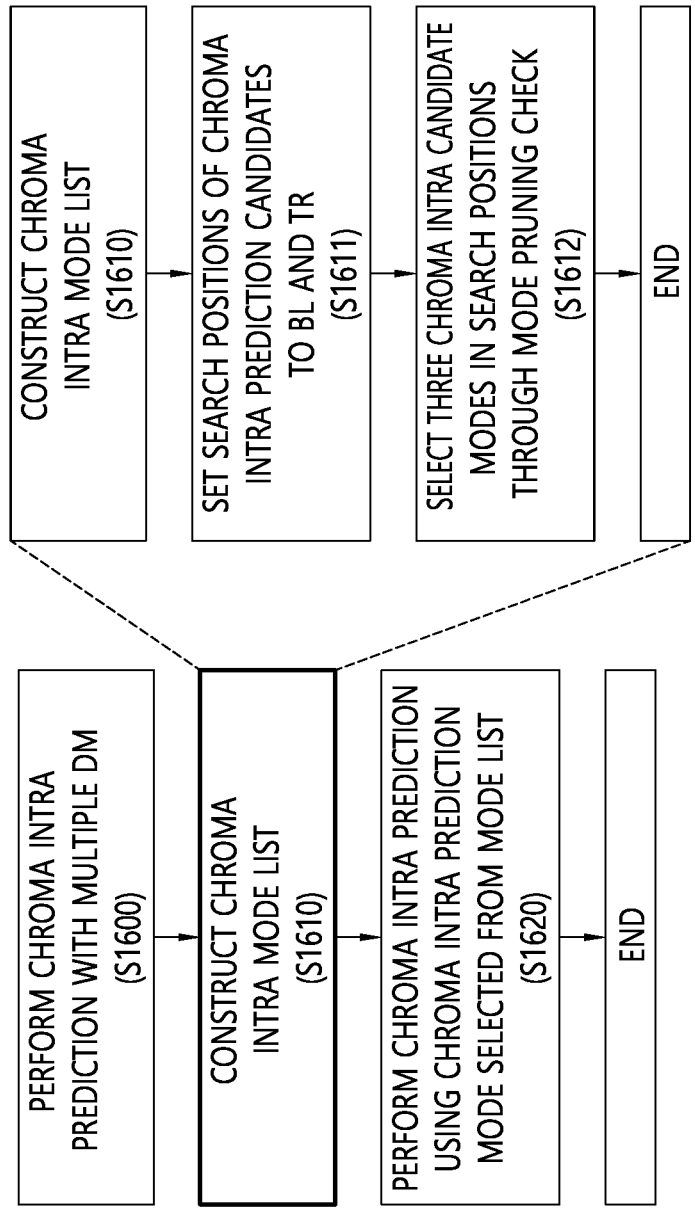
FIG. 16 is a control flowchart illustrating a deriving method according to an embodiment for the chroma intra prediction mode selection position of FIG. 15.

FIG. 16 is a control flowchart illustrating a deriving method according to an embodiment for the chroma intra prediction mode selection position of FIG. 15.

Other steps in FIG. 16 are the same as those in FIGS. 12 and 14, and in the step of constructing the chroma intra mode list according to FIG. 16 (S1610), first, search positions of the chroma intra prediction candidates are set to BL and TR (S1611).

Thereafter, three chroma intra candidate modes are selected from the search positions through a mode pruning check (S1612).

Figure 17:
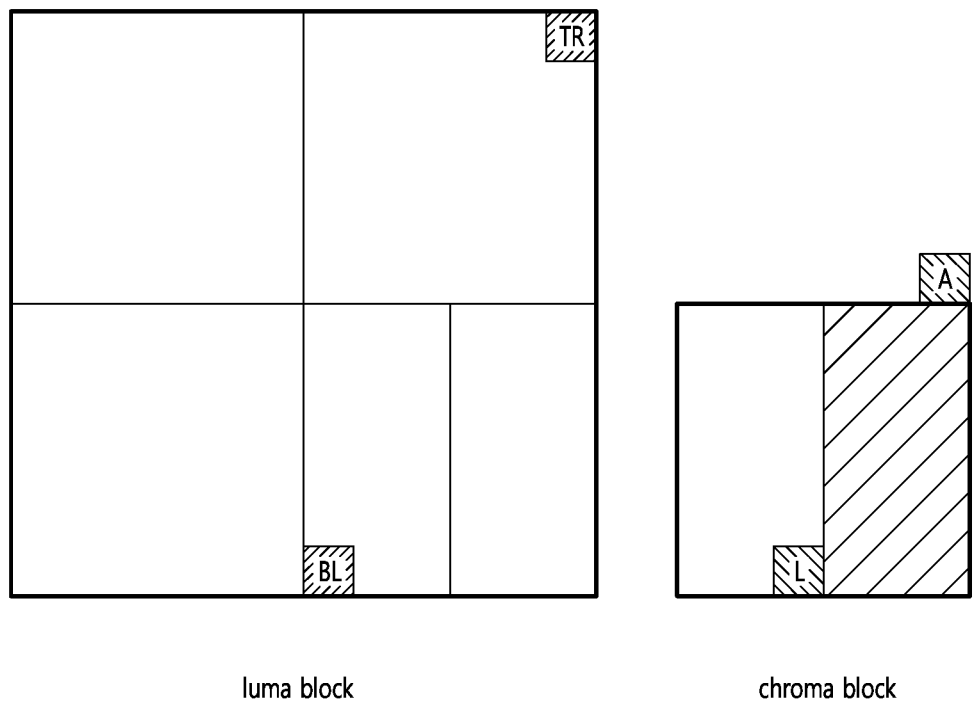
FIG. 17 is a diagram illustrating a DM that may be applied when deriving an intra prediction mode of a chroma block according to still another embodiment of this document.

FIG. 17 is a diagram illustrating a DM that may be applied when deriving an intra prediction mode of a chroma block according to still another embodiment of this document.

According to this embodiment, in order to further increase the accuracy of selection of a chrominance intra prediction mode candidate, in the case of the number of intra prediction modes of the chrominance image being three, intra prediction mode candidates may be determined at four candidate positions as shown in FIG. 16.

That is, as in FIG. 16, the DM position and the neighboring positions of the current chrominance block are all considered. The BL, AR, and AL positions are omitted based on that the L and A, which are positions used for 6 MPM mode positions of the luminance block intra prediction and the AMVP of the inter prediction, are selected with the highest probability, and also in the DM position (the luminance block position at the same position as the current chrominance block), only the BL and TR positions that have the most influence on the current chrominance block were considered. When using four selection positions as above, it is possible to minimize the reduction in coding efficiency while simultaneously reducing the cycle delay in hardware implementation at least by half. According to the example of FIG. 17, three prediction modes may be selected as intra prediction mode candidates of a chrominance image without the repeated selection of same mode on a first come, first served basis through the following order.

(1) DM (direct mode) mode: In order of BL and TR positions of the co-located luminance block, selecting an intra prediction mode corresponding to each position as an intra prediction mode of a chrominance image (2) In order of the L and A blocks, which are current chrominance block neighboring blocks, selecting a corresponding intra prediction mode as an intra prediction mode of a chrominance image (3) Selecting the PLANAR mode and the DC mode as intra prediction modes of a chrominance image (4) Selecting −1 and +1 angular modes to the previously selected angular mode as intra prediction modes of a chrominance image (5) Selecting VERTICAL mode, HORIZONTAL mode, Nos. 2, 34, 66, 10, and 26 modes as intra prediction modes of a chrominance image FIG. 18 is a control flowchart illustrating a deriving method according to an embodiment for the chroma intra prediction mode selection position of FIG. 17.

Figure 18:
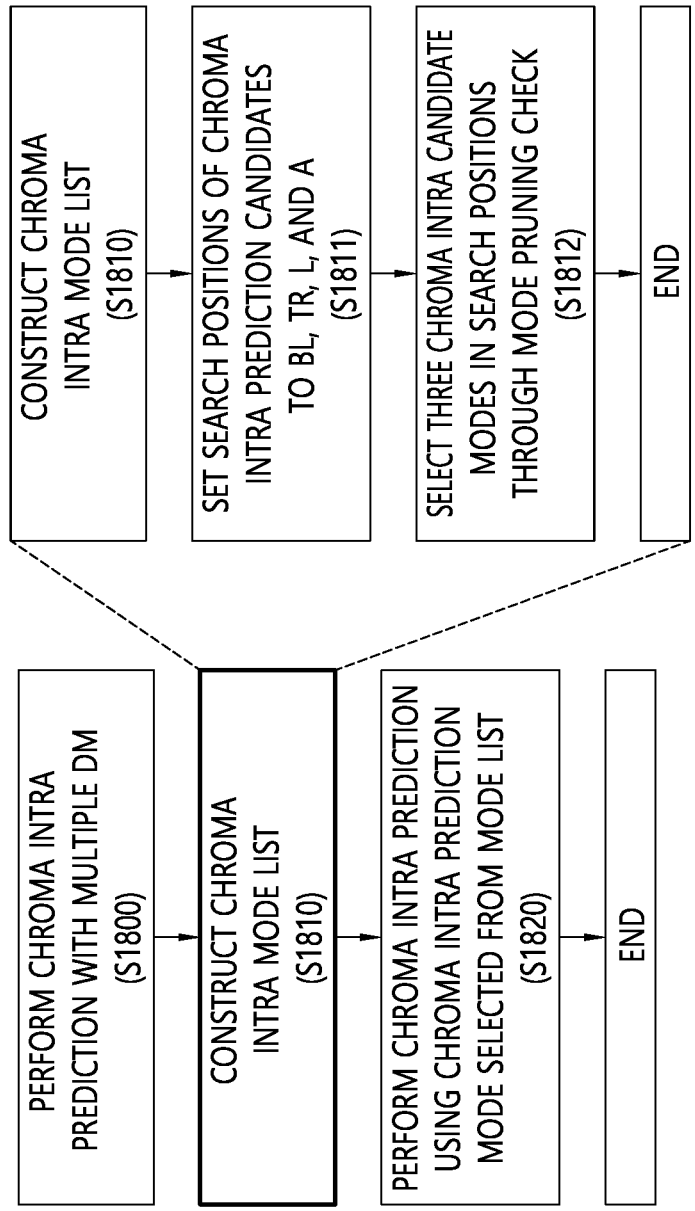
FIG. 18 is a control flowchart illustrating a deriving method according to an embodiment for the chroma intra prediction mode selection position of FIG. 17.

Other steps in FIG. 18 are the same as those in FIGS. 12, 14 and 16, and in the step of constructing the chroma intra mode list according to FIG. 18 (S1810), first, search positions of the chroma intra prediction candidates are set to BL, TR, L and A (S1811).

Thereafter, three chroma intra candidate modes are selected from the search positions through a mode pruning check (S1812).

The embodiments according to this document may be used for a chroma intra prediction mode selection and prediction, and the intra predicted chrominance block may be used to obtain a residual image through a difference from the original image in the encoding apparatus, or used to obtain a reconstructed image through an addition with a residual signal in the decoding apparatus.

Meanwhile, hereinafter, a method is proposed for simplifying context modeling used for mode binarization of a chrominance image according to an embodiment of this document. In the context modeling used for CABAC encoding and decoding, high compression efficiency can be obtained by accumulating the encoding/decoding status of each bin and reflecting it in binarization.

However, in hardware implementation of this context modeling, disadvantages, such as, time delay or additional use of memory in the decoding apparatus, are caused because the past coding status must be considered and stored (parsing dependency). This embodiment is provided for reducing the disadvantages of the hardware implementation described above by simplifying the context modeling used for mode binarization of a chrominance image.

Tables 4 to 7 illustratively show simplification of context modeling for chrominance image intra prediction mode binarization.

TABLE 4

| Chroma mode | Context model 0 | bypass | bypass | bypass |
|---|---|---|---|---|
| Mode0 | 0 | | | |
| Mode1 | 1 | 0 | | |
| Mode2 | 1 | 1 | 0 | |
| Mode3 | 1 | 1 | 1 | 0 |
| Mode4 | 1 | 1 | 1 | 1 |

TABLE 5

| Chroma mode | Context model 0 | bypass |
|---|---|---|
| Mode0 | 0 | |
| Mode1 | 1 | 0 |
| Mode2 | 1 | 1 |

TABLE 6

| Chroma mode | bypass | bypass | bypass | bypass |
|---|---|---|---|---|
| Mode0 | 0 | | | |
| Mode1 | 1 | 0 | | |
| Mode2 | 1 | 1 | 0 | |
| Mode3 | 1 | 1 | 1 | 0 |
| Mode4 | 1 | 1 | 1 | 1 |

TABLE 7

| Chroma mode | bypass | bypass |
|---|---|---|
| Mode0 | 0 | |
| Mode1 | 1 | 0 |
| Mode2 | 1 | 1 |

Tables 4 and 5 show a case in which mode encoding simplification is performed by applying context modeling only to the first bin when the chrominance image intra prediction mode is binarized. Table 4 shows a case where the number of chrominance image intra prediction modes is five, and Table 5 shows a case where the number of chrominance image intra prediction modes is three. By applying context modeling only to the first mode (mode 0 in Tables 4 and 5), which is most sensitive to the prediction mode selection probability, it is possible to minimize the reduction in coding efficiency, and at the same time reduce the disadvantages of hardware implementation. Alternatively, the reduction in coding efficiency can be further minimized by applying context modeling only to the first and second bins.

Alternatively, as in the embodiments of Tables 6 and 7, binarization may be performed with bypass for all without performing context modeling. Table 6 shows a case where the number of chrominance image intra prediction modes is five, and Table 7 shows a case where the number of chrominance image intra prediction modes is three.

In the case of the above example, since encoding/decoding of the intra prediction mode of a chrominance image is performed with bypass for all the bins, the bin parsing dependency problem in mode encoding can be addressed, and hardware implementation complexity can be reduced.

Figure 19:
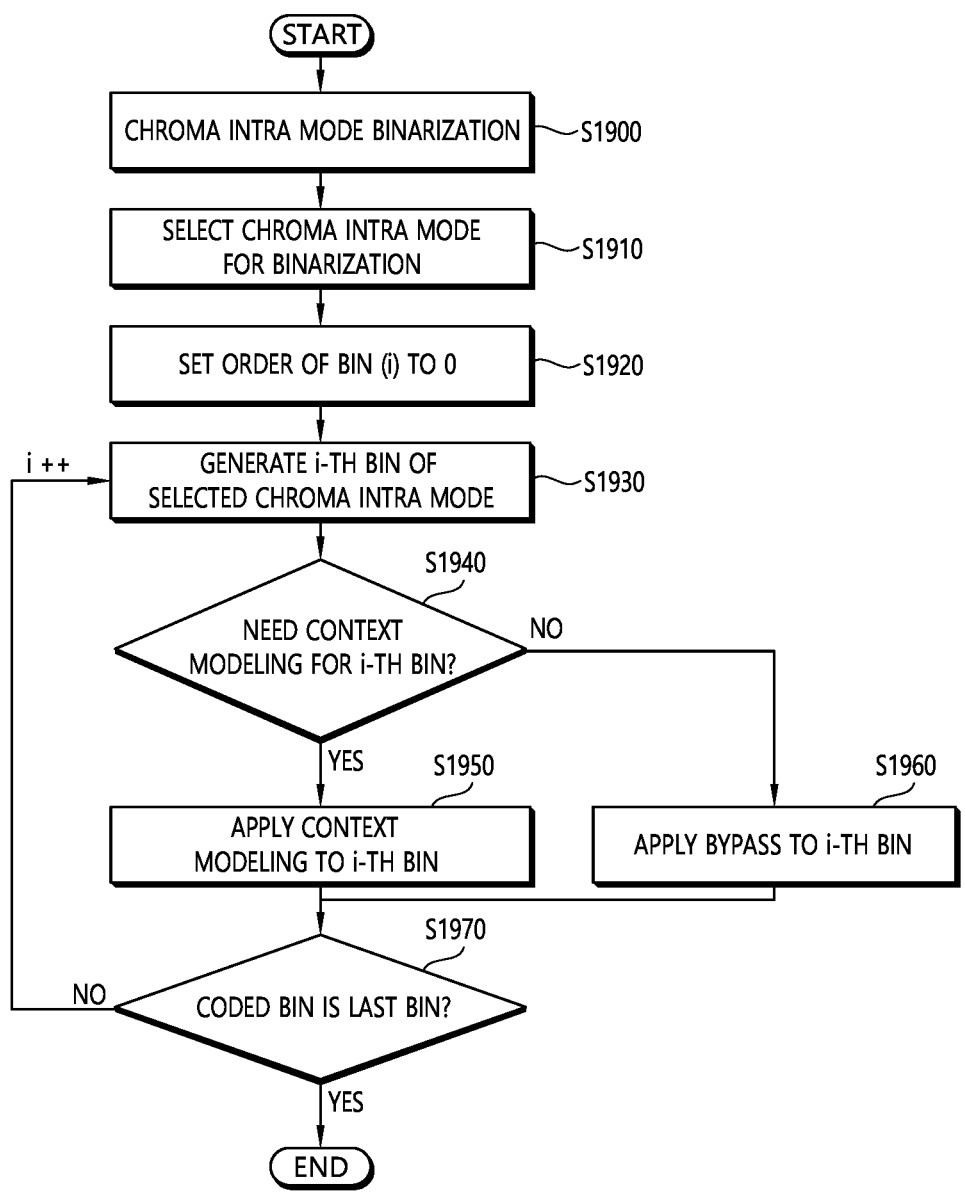
FIG. 19 is a control flowchart illustrating a chroma intra mode coding method according to an embodiment of this document.

FIG. 19 is a control flowchart illustrating a chroma intra mode coding method according to an embodiment of this document.

As shown, for the chroma intra mode binarization (S1900) according to this embodiment, a chroma intra mode for binarization is first selected (S1910).

The order (i) of bin is set to 0 (S1920), and an i-th bin of the selected chroma intra mode is generated (S1930).

Then, it may be determined whether or not the i-th bin needs context modeling (S1940).

As a result of the determination, if the i-th bin needs context modeling, the context modeling is applied to the i-th bin (S1950), and if not, a bypass is applied to the i-th bin (S1960).

After coding the i-th bin by applying context modeling or bypass, it may be determined whether or not the coded bin is the last bin (S1970), and if the coded bin is not the last bin, a (i+1)th bin, that is, a next bin may be created.

The method proposed in this document may be used when encoding and decoding a chroma intra prediction mode, and the intra predicted chrominance block is used to obtain a residual image through a difference from the original image in the encoding apparatus, or used to obtain a reconstructed image through an addition with a residual signal in the decoding apparatus.

Figure 20:
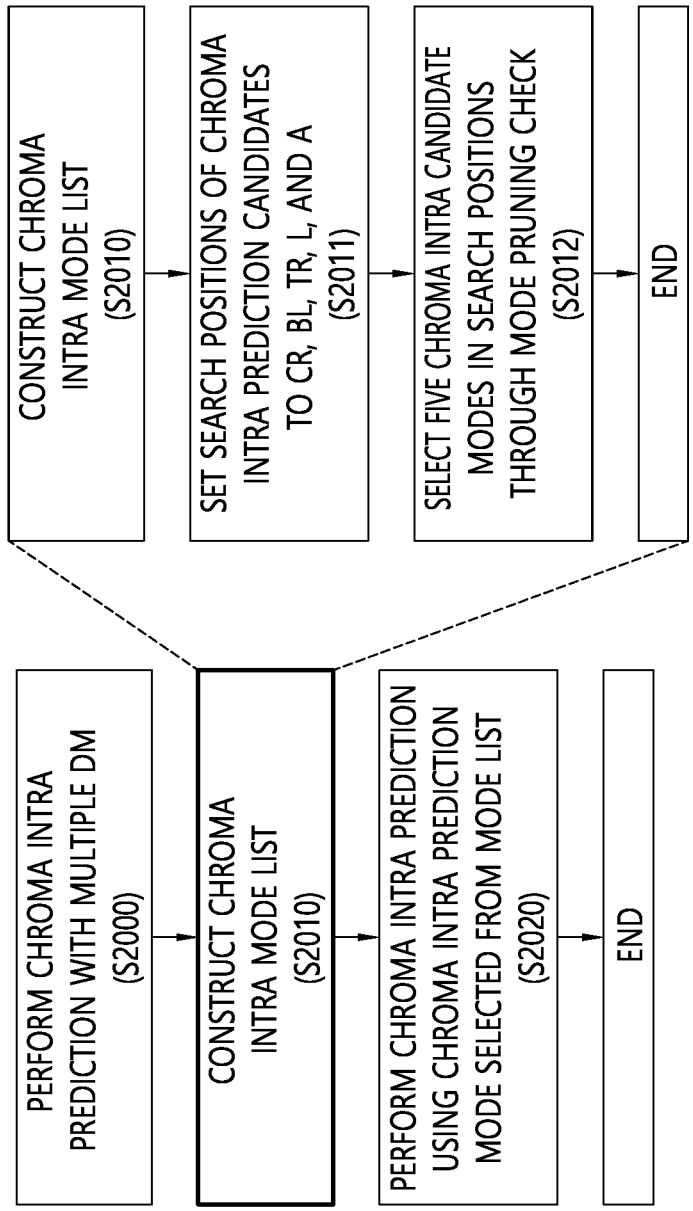
FIG. 20 is a control flowchart illustrating a deriving method according to another embodiment for the chroma intra prediction mode selection position of FIG. 15.

FIG. 20 is a control flowchart illustrating a deriving method according to another embodiment for the chroma intra prediction mode selection position of FIG. 15.

According to this embodiment, five intra prediction modes of a chrominance image are selected under the consideration of only the BL and TR positions of the DM mode position. Under the consideration of only the BL and TR positions illustrated in FIG. 15, five modes for chroma intra prediction may be determined on a first come, first served basis through the following process.

(1) In order of BL and TR positions of the co-located luminance block, selecting an intra prediction mode corresponding to each position as an intra prediction mode of a chrominance image (2) Selecting the PLANAR mode, the DC mode, the VERTICAL mode, the HORIZONTAL mode, and No. 66 mode as intra prediction modes of a chrominance image If this is summarized through FIG. 20, in the step of constructing a chroma intra mode list (S2010), the search positions of the chroma intra prediction candidates are set to BL and TR (S2011).

Thereafter, five chroma intra candidate modes are selected from the search positions through a mode pruning check (S2012).

Figure 21:
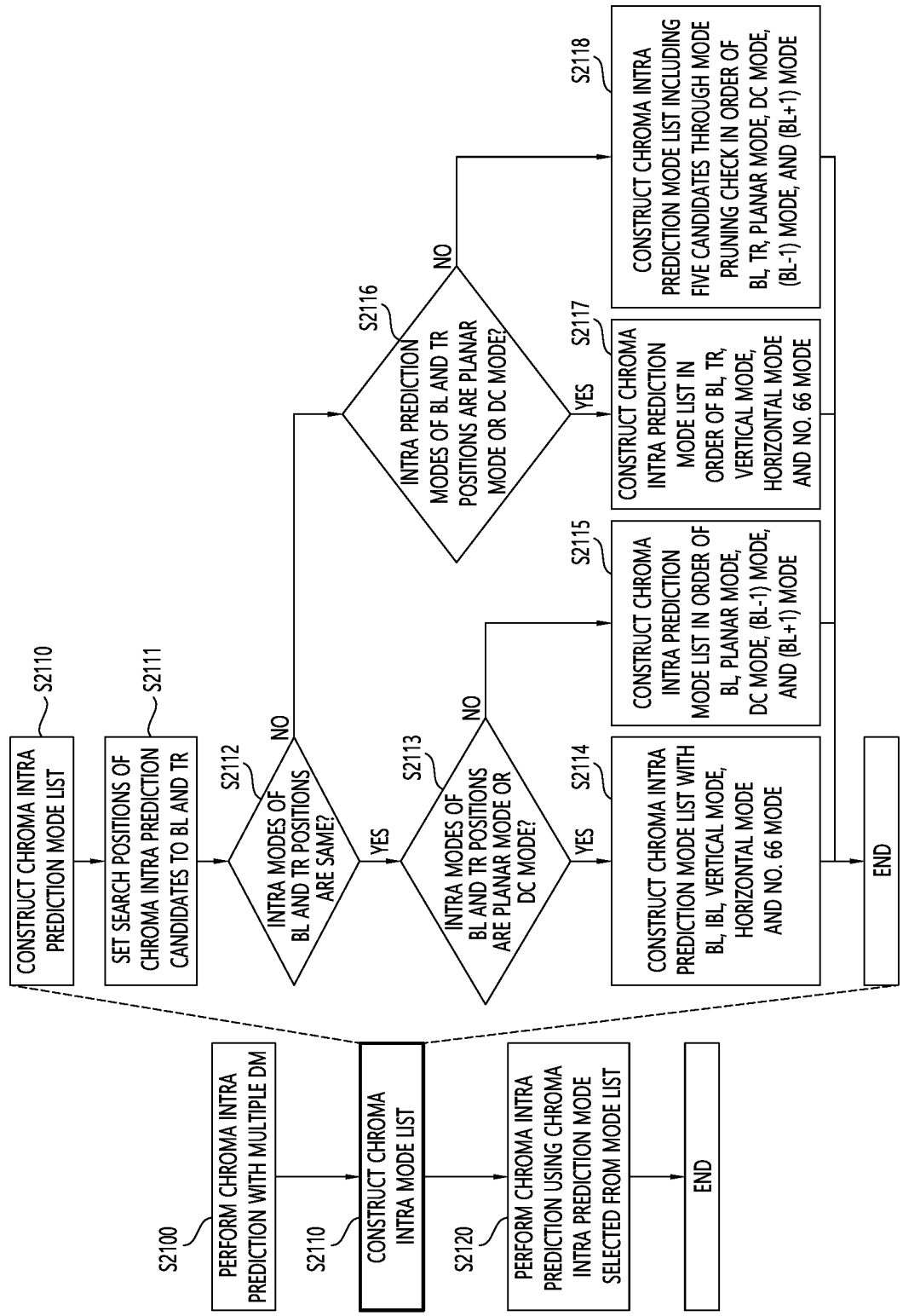
FIG. 21 is a control flowchart illustrating a deriving method according to still another embodiment for the chroma intra prediction mode selection position of FIG. 15.

FIG. 21 is a control flowchart illustrating a deriving method according to still another embodiment for the chroma intra prediction mode selection position of FIG. 15.

Under the consideration of only the BL and TR positions illustrated in FIG. 15, five modes for chroma intra prediction may be determined on a first come, first served basis through the following process. According to this embodiment, the number of pruning checks can be reduced compared to the embodiment of FIG. 20.

(1) When the intra prediction modes of BL and TR positions are the same, and both modes are the DC mode or PLANAR mode: the BL, the !BL, the VERTICAL mode, the HORIZONTAL mode, No. 66 mode (2) When the intra prediction modes of BL and TR positions are the same, and both modes are neither the DC mode nor PLANAR mode: the BL mode, the PLANAR mode, the DC mode, the (BL−1) mode, the (BL+1) mode (3) When the intra prediction modes of BL and TR positions are different from each other, and are the DC mode and PLANAR mode: Selecting five on a first come, first served basis in order of BL, TR, the VERTICAL mode, the HORIZONTAL mode, and No. 66 mode (4) When the intra prediction modes of BL and TR positions are different from each other, and are neither the DC mode nor PLANAR mode: Selecting five on a first come, first served basis in order of BL, TR, the PLANAR mode, the DC mode, the (BL−1) mode, and the (BL+1) mode Here, !BL is a non-BL mode, that is, when BL is the PLANAR mode, !BL is the DC mode, and when BL is the DC mode, !BL is the PLANAR mode. Meanwhile, the operator ! may be a binary operator, and may mean inverse. Therefore, it can be interpreted as !0=1, !1=0, and if the PLANAR mode is 0 and the DC mode is 1, !BL is a non-BL mode, that is, if BL is a PLANAR mode, !BL may be a DC mode, and if BL is a DC mode, !BL may be interpreted as a PLANAR mode.

The above process is summarized with reference to FIG. 21 as follows.

First, in the step of constructing a chroma intra prediction mode list (S2110), the search positions of the chroma intra prediction candidates are set to BL and TR (S2111).

Then, it is determined whether or not the intra modes of BL and TR positions are the same (S2112).

As a result of the determination, if the intra modes of BL and TR positions are the same, it is determined whether the intra modes of BL and TR positions are the PLANAR mode or the DC mode (S2113).

If the intra modes of BL and TR positions are the PLANAR mode or the DC mode, the chroma intra prediction mode list is constructed with a mode of the BL position, the non-BL mode, that is, the PLANAR mode and the DC mode, the VERTICAL mode, the HORIZONTAL mode, and No. 66 mode (S2114).

In contrast, if the intra prediction modes of BL and TR positions are neither the PLANAR mode nor the DC mode, the chroma intra prediction mode list is constructed with a mode of the BL position, a PLANAR mode, a DC mode, a (BL−1) mode, and a (BL+1) mode in this order (S2115).

Returning back to S2112, if the intra modes of BL and TR positions are not the same, it is determined whether the intra prediction modes of BL and TR positions are a PLANAR mode or a DC mode (S2116).

As a result of the determination, if the intra prediction modes of BL and TR positions are the PLANAR mode or the DC mode, the chroma intra prediction mode list is constructed with BL, TR, the VERTICAL mode, the HORIZONTAL mode, and No. 66 mode in this order (S2117).

In contrast, if the intra prediction modes of BL and TR positions are neither the PLANAR mode nor the DC mode, the chroma intra prediction mode list is constructed with five modes through a pruning check in order of BL, TR, the PLANAR mode, the DC mode, the (BL−1) mode, and the (BL+1) mode (S2118).

Figure 22:
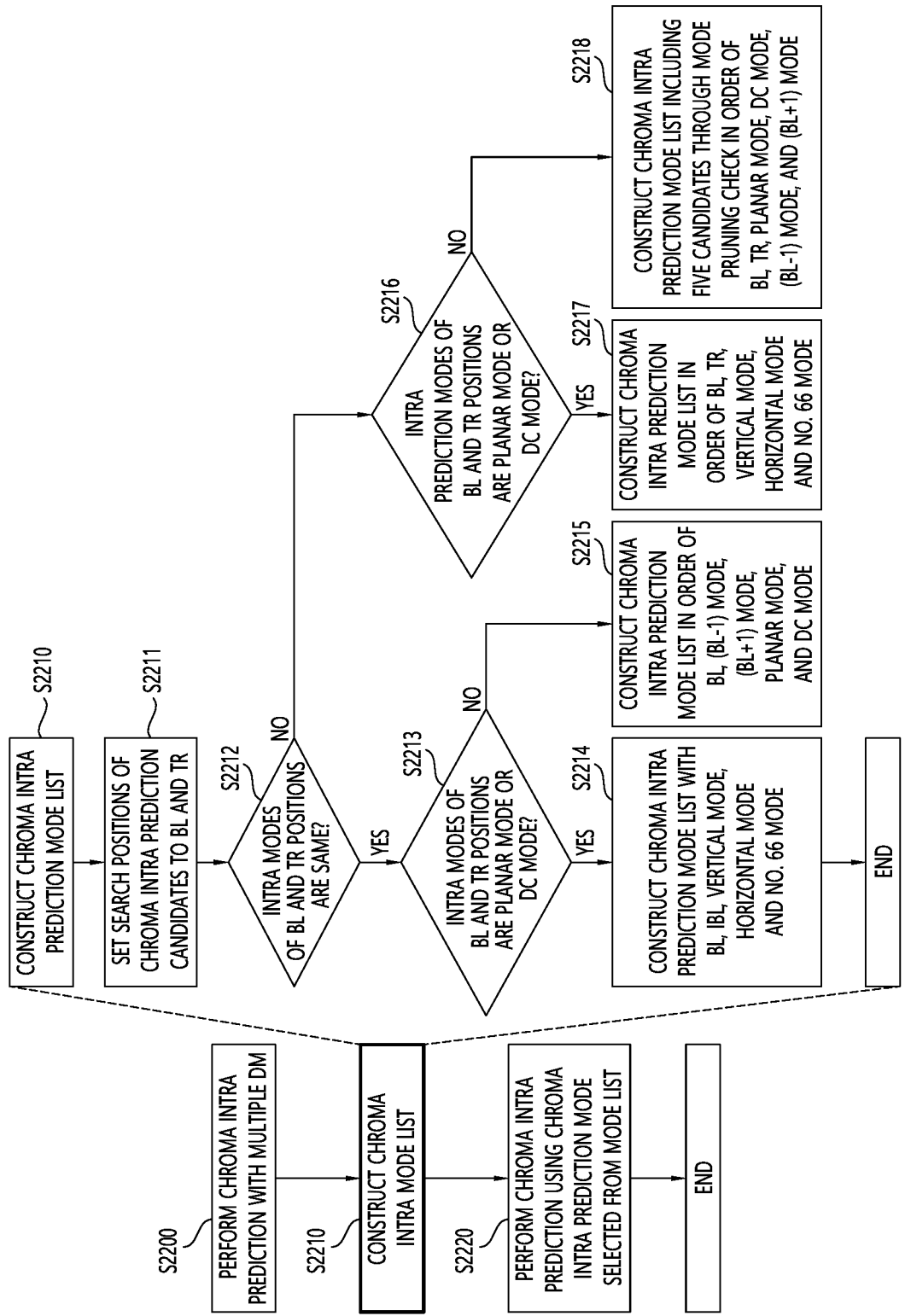
FIG. 22 is a control flowchart illustrating a deriving method according to still another embodiment for the chroma intra prediction mode selection position of FIG. 15.

FIG. 22 is a control flowchart illustrating a deriving method according to still another embodiment for the chroma intra prediction mode selection position of FIG. 15.

According to this embodiment, the number of pruning checks can be reduced compared to the chroma intra prediction mode list of FIG. 21. The chroma intra prediction mode list according to this embodiment is constructed as follows.

(1) When the intra prediction modes of BL and TR positions are the same, and both modes are the DC mode or PLANAR mode: BL, !BL, the VERTICAL mode, the HORIZONTAL mode, No. 66 mode (2) When the intra prediction modes of BL and TR positions are the same, and both modes are neither the DC mode nor PLANAR mode: the BL mode, the (BL−1) mode, the (BL+1) mode, the PLANAR mode, the DC mode (3) When the intra prediction modes of BL and TR positions are different from each other, and are the DC mode and PLANAR mode: Selecting five on a first come, first served basis in order of BL, TR, the VERTICAL mode, the HORIZONTAL mode, and No. 66 mode (4) When the intra prediction modes of BL and TR positions are different from each other, and are neither the DC mode nor PLANAR mode: Selecting five on a first come, first served basis in order of BL, TR, the PLANAR mode, the DC mode, the (BL−1) mode, and the (BL+1) mode This is summarized with reference to FIG. 22 as follows.

First, in the step of constructing a chroma intra prediction mode list (S2210), the search positions of the chroma intra prediction candidates are set to BL and TR (S2211).

Then, it is determined whether or not the intra modes of BL and TR positions are the same (S2212).

As a result of the determination, if the intra modes of BL and TR positions are the same, it is determined whether the intra modes of BL and TR positions are the PLANAR mode or the DC mode (S2213).

If the intra modes of BL and TR positions are the PLANAR mode or the DC mode, the chroma intra prediction mode list is constructed with a mode of the BL position, the non-BL mode, that is, the PLANAR mode and the DC mode, the VERTICAL mode, the HORIZONTAL mode, and No. 66 mode in this order (S2214).

In contrast, if the intra prediction modes of BL and TR positions are neither the PLANAR mode nor the DC mode, the chroma intra prediction mode list is constructed with a mode of the BL position, the (BL−1) mode, the (BL+1), the PLANAR mode, the DC mode (S2215).

Returning back to 52212, if the intra modes of BL and TR positions are not the same, it is determined whether the intra prediction modes of BL and TR positions are a PLANAR mode or a DC mode (S2216).

As a result of the determination, if the intra prediction modes of BL and TR positions are the PLANAR mode or the DC mode, the chroma intra prediction mode list is constructed with BL, TR, the VERTICAL mode, the HORIZONTAL mode, and No. 66 mode in this order (S2217).

In contrast, if the intra prediction modes of BL and TR positions are neither the PLANAR mode nor the DC mode, the chroma intra prediction mode list is constructed with five modes through a pruning check in order of BL, TR, the PLANAR mode, the DC mode, the (BL−1) mode, and the (BL+1) mode (S2218).

When hardware is implemented in the same way as in FIG. 22, up to 2 cycles and 2 mode pruning checks are required, so it has almost the same hardware implementation complexity as when MDMS is not used.

Figure 23:
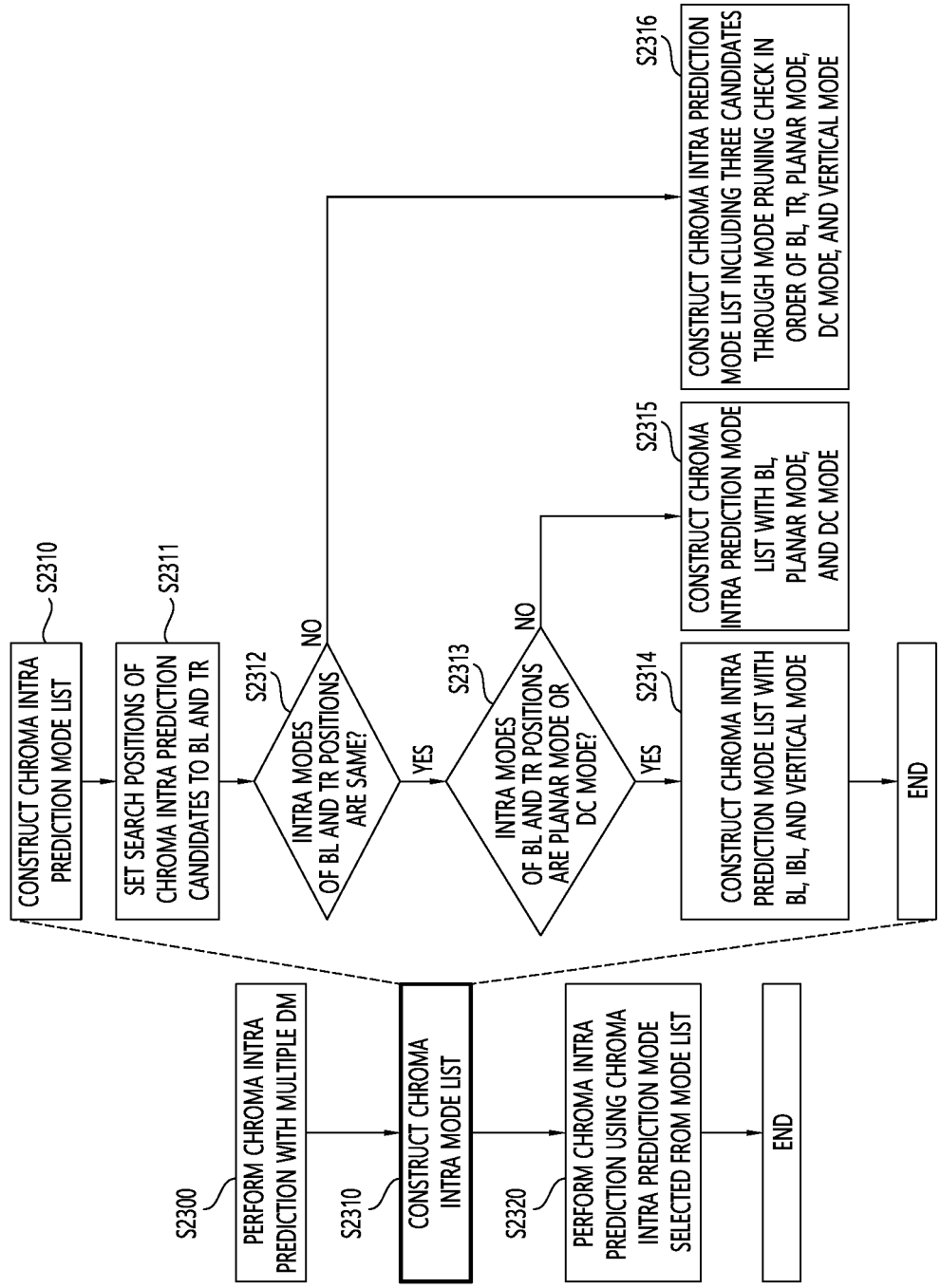
FIG. 23 is a control flowchart illustrating a deriving method according to still another embodiment for the chroma intra prediction mode selection position of FIG. 15.

FIG. 23 is a control flowchart illustrating a deriving method according to still another embodiment for the chroma intra prediction mode selection position of FIG. 15.

According to this embodiment, in order to derive a chroma intra prediction mode, three prediction modes instead of five at the selection positions of FIG. 15 may be determined in the following on a first come, first served basis.

(1) When the intra prediction modes of BL and TR positions are the same, and both modes are the DC mode or PLANAR mode: Selecting BL, !BL and the VERTICAL mode in this order (2) When the intra prediction modes of BL and TR positions are the same, and both modes are neither the DC mode nor PLANAR mode: Selecting the BL mode, the PLANAR mode, and the DC mode in this order (3) When the intra prediction modes of BL and TR positions are different from each other: Selecting three modes on a first come, first served basis without the repeated selection of same mode in order of the BL, the TR, the PLANAR mode, the DC mode and the VERTICAL mode This is summarized with reference to FIG. 23 as follows.

First, in the step of constructing a chroma intra prediction mode list (S2310), the search positions of the chroma intra prediction candidates are set to BL and TR (S2311).

Then, it is determined whether or not the intra modes of BL and TR positions are the same (S2312).

As a result of the determination, if the intra modes of BL and TR positions are the same, it is determined whether the intra modes of BL and TR positions are the PLANAR mode or the DC mode (S2313).

If the intra modes of BL and TR positions are the PLANAR mode or the DC mode, the chroma intra prediction mode list is constructed with a mode of the BL position, the non-BL mode, that is, the PLANAR mode and the DC mode, and the VERTICAL mode (S2314).

In contrast, if the intra prediction modes of BL and TR positions are neither the PLANAR mode nor the DC mode, the chroma intra prediction mode list is constructed with a mode of the BL position, the PLANAR mode, and the DC mode (S2315).

Returning back to S2312, if the intra modes of BL and TR positions are not the same, for the chroma intra prediction mode list, three modes are selected in order of the BL, the TR, the PLANAR mode, the DC mode, and the VERTICAL mode without the repeated selection of same mode on a first come, first served basis (S2316).

Figure 24:
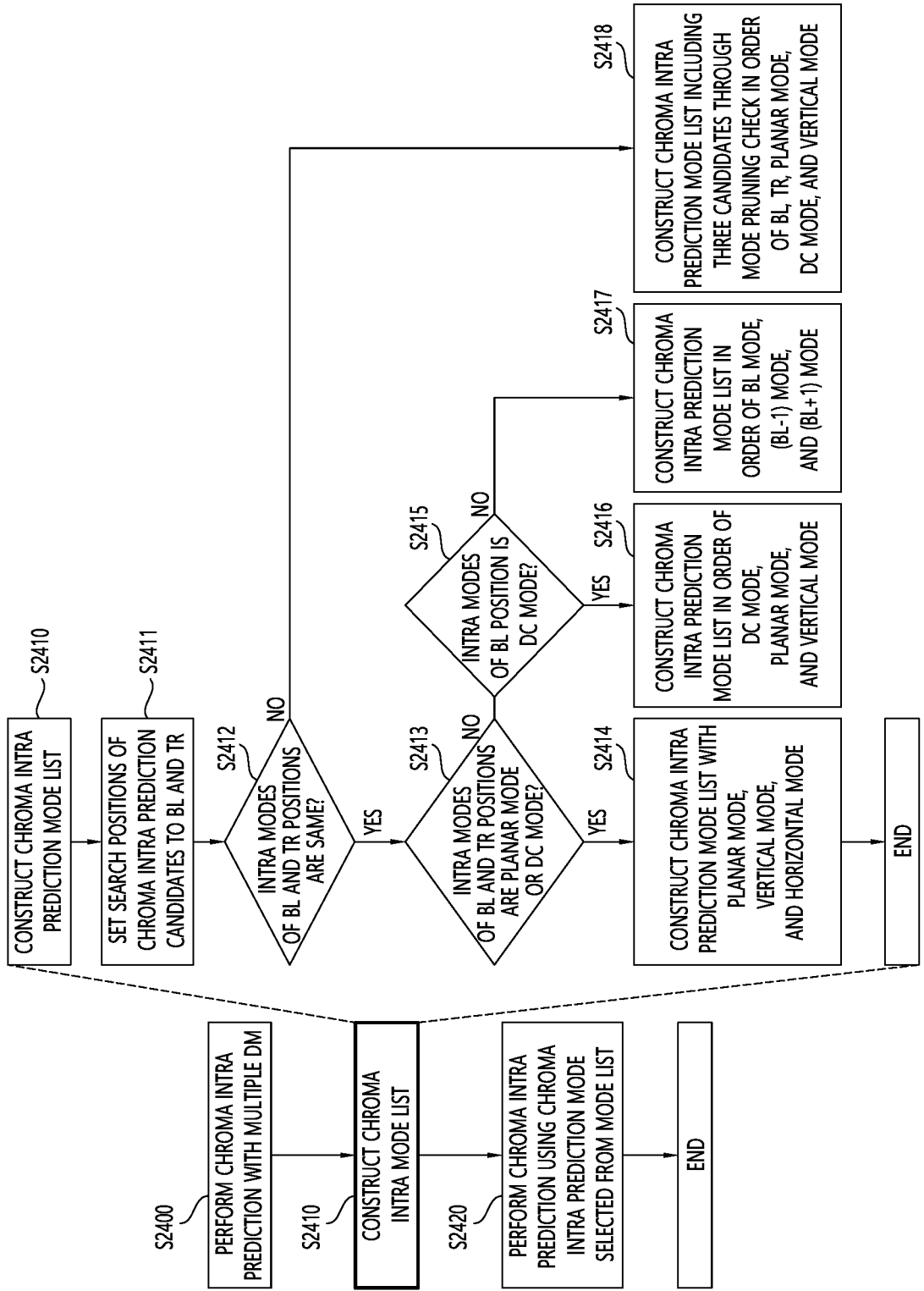
FIG. 24 is a control flowchart illustrating a deriving method according to still another embodiment for the chroma intra prediction mode selection position of FIG. 15.

FIG. 24 is a control flowchart illustrating a deriving method according to still another embodiment for the chroma intra prediction mode selection position of FIG. 15.

According to this embodiment, in order to derive a chroma intra prediction mode, three prediction modes instead of five at the selection positions of FIG. 15 may be determined in the following on a first come, first served basis.

(1) When the intra prediction modes of BL and TR positions are the same, and both modes are the PLANAR mode: the PLANAR mode, the VERTICAL mode, and the HORIZONTAL mode (2) When the intra prediction modes of BL and TR positions are the same, and both modes are the DC mode: the DC mode, the PLANAR mode, and the VERTICAL mode (3) When the intra prediction modes of BL and TR positions are the same, and both modes are neither the DC mode nor PLANAR mode: the BL mode, the (BL−1) mode, the (BL+1) mode (4) When the intra prediction modes of BL and TR positions are different from each other, and are the PLANAR mode and the DC mode: Selecting three modes on a first come, first served basis without the repeated selection of same mode in order of the BL, the TR, the PLANAR mode, the DC mode and the VERTICAL mode This is summarized with reference to FIG. 24 as follows.

First, in the step of constructing a chroma intra prediction mode list (S2410), the search positions of the chroma intra prediction candidates are set to BL and TR (S2411).

Then, it is determined whether or not the intra modes of BL and TR positions are the same (S2412).

As a result of the determination, if the intra modes of BL and TR positions are the same, it is determined whether or not the intra mode of BL position is the PLANAR mode (S2413).

If the intra mode of BL position is the PLANAR mode, the chroma intra prediction mode list is constructed with the PLANAR mode, the VERTICAL mode, and the HORIZONTAL mode (S2414).

In contrast, if the intra mode of BL position is not the PLANAR mode, it is determined whether or not the BL mode is the DC mode (S2415).

As a result of the determination, if the BL mode is the DC mode, the chroma intra prediction mode list is constructed with the DC mode, the PLANAR mode, and the VERTICAL mode (S2416).

In contrast, if the BL mode is not the DC mode, the chroma intra prediction mode list is constructed with the BL mode, the (BL−1) mode, and the (BL+1) mode (S2417).

Returning back to S2412, if the intra modes of BL and TR positions are not the same, the chroma intra prediction mode list may be constructed with three modes in order of the BL, the TR, the PLANAR mode, the DC mode, and the VERTICAL mode through a mode pruning check (S2418).

Figure 25:
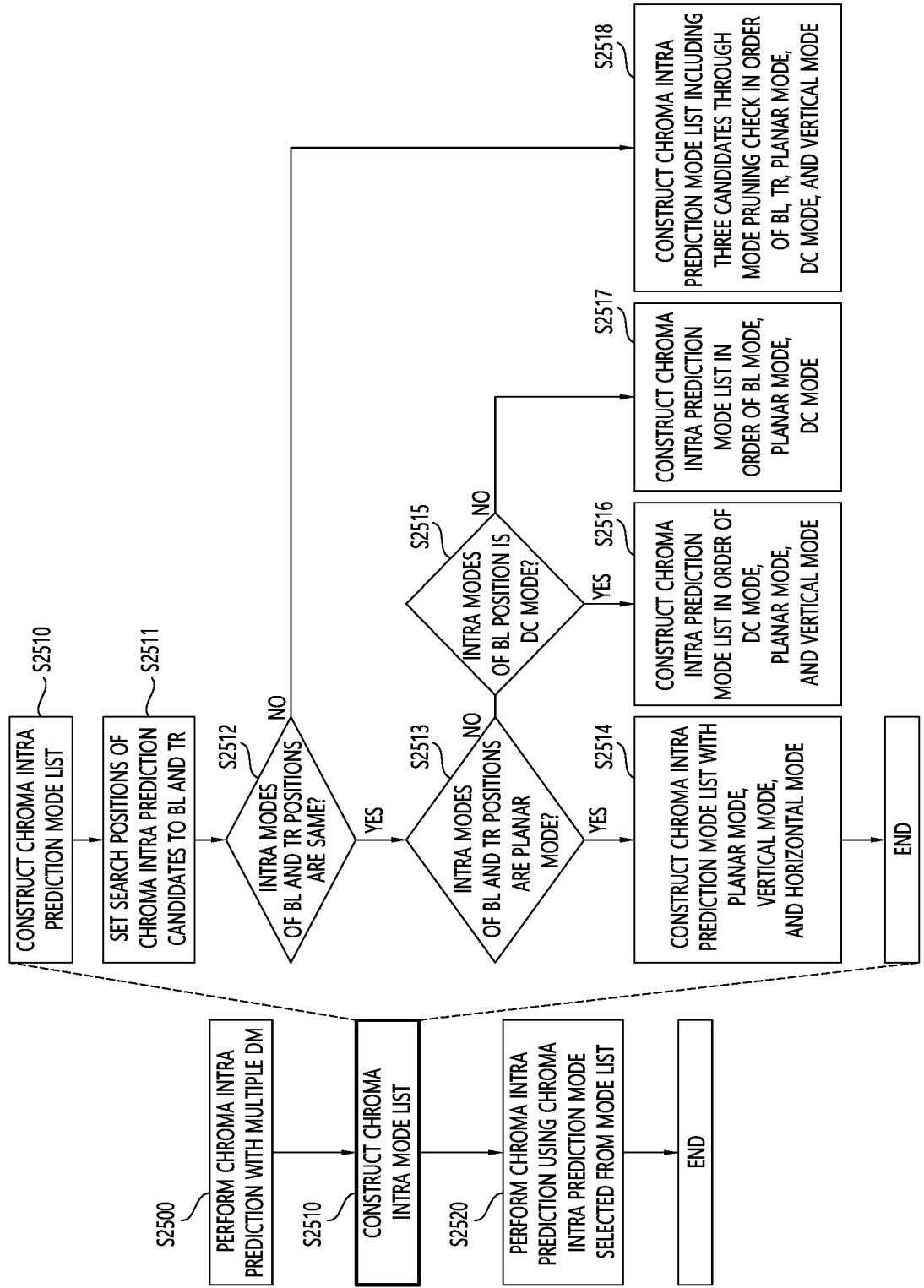
FIG. 25 is a control flowchart illustrating a deriving method according to still another embodiment for the chroma intra prediction mode selection position of FIG. 15.

FIG. 25 is a control flowchart illustrating a deriving method according to still another embodiment for the chroma intra prediction mode selection position of FIG. 15.

According to this embodiment, in order to derive a chroma intra prediction mode, three prediction modes instead of five at the selection positions of FIG. 15 may be determined in the following on a first come, first served basis.

(1) When the intra prediction modes of BL and TR positions are the same, and both modes are the PLANAR mode: the PLANAR mode, the VERTICAL mode, and the HORIZONTAL mode (2) When the intra prediction modes of BL and TR positions are the same, and both modes are the DC mode: the DC mode, the PLANAR mode, and the VERTICAL mode (3) When the intra prediction modes of BL and TR positions are the same, and both modes are neither the DC mode nor PLANAR mode: the BL mode, the PLANAR mode, and the DC mode (4) When the intra prediction modes of BL and TR positions are different from each other, and are the PLANAR mode and the DC mode: Selecting three modes on a first come, first served basis without the repeated selection of same mode in order of the BL, the TR, the PLANAR mode, the DC mode and the VERTICAL mode This is summarized with reference to FIG. 25 as follows.

First, in the step of constructing a chroma intra prediction mode list (S2510), the search positions of the chroma intra prediction candidates are set to BL and TR (S2511).

Then, it is determined whether or not the intra modes of BL and TR positions are the same (S2512).

As a result of the determination, if the intra modes of BL and TR positions are the same, it is determined whether or not the intra mode of BL position is the PLANAR mode (S2513).

If the intra mode of BL position is the PLANAR mode, the chroma intra prediction mode list is constructed with the PLANAR mode, the VERTICAL mode, and the HORIZONTAL mode (S2514).

In contrast, if the intra mode of BL position is not the PLANAR mode, it is determined whether or not the BL mode is the DC mode (S2515).

As a result of the determination, if the BL mode is the DC mode, the chroma intra prediction mode list is constructed with the DC mode, the PLANAR mode, and the VERTICAL mode (S2516).

In contrast, if the BL mode is not the DC mode, the chroma intra prediction mode list is constructed with the BL mode, the PLANAR mode, and the DC mode (S2517).

Returning back to S2512, if the intra modes of BL and TR positions are not the same, the chroma intra prediction mode list may be constructed with three modes in order of the BL, the TR, the PLANAR mode, the DC mode, and the VERTICAL mode through a mode pruning check (S2518).

When hardware is implemented as in FIGS. 23 to 25, up to tow cycles and two pruning checks are required, so it has almost the same hardware implementation complexity as when the MDMS is not used.

Alternatively, according to an embodiment, a method of partially applying the embodiment (MDMS) described with reference to FIG. 10 is proposed based on a chroma image intra prediction structure according to VTM 3.0, which is a VVC standard software.

Figure 26:
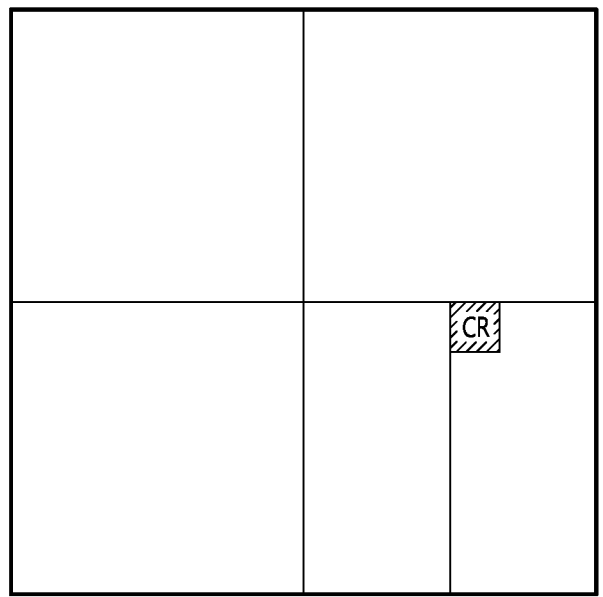
FIG. 26 is a diagram illustrating a DM that may be applied when deriving an intra prediction mode of a chroma block according to still another embodiment of this document.

FIG. 26 is a diagram illustrating a DM that may be applied when deriving an intra prediction mode of a chroma block according to still another embodiment of this document.

When chroma image intra prediction of current VTM 3.0 is performed, five intra prediction directions may be selected as follows. In this embodiment, the CCLM mode is omitted for convenience of description.

Prediction mode used in chroma intra prediction mode
1. DM mode
2. PLANAR mode
3. VERTICAL mode
4. HORIZONTAL mode
5. DC mode As illustrated in FIG. 26, the DM mode may refer to an intra prediction mode of a luminance block located in the center (CR) in the co-located luminance block of the current chrominance block. Thereafter, a candidate list for a chroma intra prediction mode may be generated using four determined intra prediction modes (PLANAR mode, VERTICAL mode, HORIZONTAL mode, and DC mode). The position of CR may indicate the bottom-right sample position among the four samples located at the center of the target block.

When the intra prediction mode of the DM mode is the same as one of the rest four basic intra prediction modes, the same intra prediction mode may be replaced with a right upward diagonal mode (e.g., in the case of No. 67 intra prediction mode, No. 66 mode).

The method of generating a chrominance image intra prediction mode as in the above embodiment is effective when the luminance and chrominance block structures are the same during intra prediction as in the conventional HEVC, but, if the luminance block and the chrominance block are separated like VTM3.0 of the current VVC, the efficiency may decrease. That is, since the luminance block corresponding to the current chrominance block is constructed with several smaller luminance block structures, DM prediction accuracy may be reduced.

Therefore, an embodiment proposes a method of adaptively selecting an intra prediction mode candidate by referring to multiple positions of a luminance block corresponding to a current chrominance block when selecting an intra prediction mode candidate of a chrominance block. Through this, even when the luminance block and the chrominance block are separated, the DM prediction accuracy can be improved, and coding efficiency can be improved.

FIG. 27 is a diagram illustrating a DM that may be applied when deriving an intra prediction mode of a chroma block according to still another embodiment of this document.

As shown, in this embodiment, when deriving a candidate for the chroma intra prediction mode, an intra mode corresponding to the TL position in FIG. 26 is additionally considered.

Also in this embodiment, a luminance block intra prediction mode of the same position (CR) as in VTM3.0 may be used in the DM mode. Thereafter, the rest four or two intra prediction mode candidates may be adaptively selected as follows. Hereinafter, the intra prediction mode of the CR position luminance block may be referred to as CR, and the intra prediction mode of the TL position luminance block of FIG. 27 may be referred to as TL.

FIGS. 28 to 33 are control flowcharts illustrating deriving methods according to various embodiments for the chroma intra prediction mode selection position.

According to an example, the chroma intra prediction mode is summarized as follows. According to this embodiment, five prediction candidate modes may be included in the chroma intra prediction mode candidate list.

−Mode 1: DM(CR) mode
 1. When the CR and the TL are different from each other
  A. Mode 2: TL mode
  B. When the CR and the TL are the PLANAR mode and the DC mode
   i. Mode 3: VERTICAL mode
   ii. Mode 4: HORIZONTAL mode
   iii. Mode 5: right upward diagonal (VDIAGONAL) mode
  C. When the CR and the TL are neither the PLANAR mode nor the DC mode
   i. Mode 3: PLANAR mode
   ii. Mode 4: DC mode
   iii. Mode 5: If the CR−1 and the TL are the same, the CR+1, or if not, the CR−1
  D. Other cases (i.e., one of the CR and the TL is the PLANAR mode or the DC mode)
   i. Mode 3: !(the smaller mode between the CR and the TL)
   ii. Mode 4: (the larger mode between the CR and the TL)−1
   iii. Mode 5: (the greater mode between the CR and the TL)+1
 2. When the CR and the TL are the same
  A. When the CR is the PLANAR mode or the DC mode
   i. Mode 2: !CR
   ii. Mode 3: VERTICAL mode
   iii. Mode 4: HORIZONTAL mode
   iv. Mode 5: right upward diagonal mode
  B. Other cases
   i. Mode 2: CR−1 mode
   ii. Mode 3: CR+1 mode
   iii. Mode 4: PLANAR mode
   iv. Mode 5: DC mode This is described with reference to FIG. 28 as follows.

After the CR and the TL are derived, a process of selecting a chroma intra prediction mode is performed, and first, it may be determined whether or not the CR and the TL are the same (S2800).

If the CR and the TL are the same, it is determined whether or not the CR is less than 2, that is, whether it is the PLANAR mode or the DC mode (S2810).

If the CR is less than 2, the chroma intra prediction candidate may include the DM (CR), the !CR, the VERTICAL mode, the HORIZONTAL mode, and the right upward diagonal mode (S2820).

If the CR is not less than 2, the chroma intra prediction candidates may include the DM(CR), the CR−1 mode, the CR+1 mode, the PLANAR mode, and the DC mode (S2830).

In contrast, if the CR and the TL are not the same, it may be determined whether or not CR+TL is less than 2 (S2840). That is, it is determined whether the CR and the TL are the PLANAR mode or the DC mode.

As a result of the determination, if CR+TL is less than 2, the chroma intra prediction candidates may include the DM (CR), the TL, the VERTICAL mode, the HORIZONTAL mode, and the right upward diagonal mode (S2850).

On the other hand, if CR+TL is not less than 2, it may be determined whether or not the CR is greater than No. 1 mode and the TL is greater than No. 1 mode (S2860). That is, it is determined whether or not the CR and the TL that are not the same are a mode of a number greater than that of the PLANAR mode or the DC mode.

As a result of the determination, if the CR is greater than No. 1 mode and the TL is greater than No. 1 mode, that is, if both the CR and the TL are a mode of a number greater than that of the PLANAR mode or the DC mode, then the chroma intra prediction candidates may include the DM(CR), the TL, the PLANAR mode, the DC mode, CR+1 when CR−1 mode and the TL are the same, and CR−1 mode in other cases (CR−1==TL?(CR+1: CR−1)) (S2870).

On the other hand, if the CR is greater than No. 1 mode and the TL is not greater than No. 1 mode, that is, if either the CR or the TL is the PLANAR mode or the DC mode, and the rest is a mode of a number greater than that of the PLANAR mode or the DC mode, then the chroma intra prediction candidates may include the DM(CR), the TL, !(the smaller mode between CR and TL) (!min(CR, TL)), (the greater mode between CR and TL)−1 (max(CR, TL)−1), (the greater mode between CR and TL)+1 (max(CR, TL)+1) mode (S2880).

The intra prediction modes included in the chroma intra prediction candidate may be added to the chroma intra prediction candidate list in order of from mode 1 to mode 5.

Further, according to another example, the chroma intra prediction mode is summarized as follows. According to this embodiment, five prediction candidate modes may be included in the chroma intra prediction mode candidate list.
 –Mode 1: DM mode
  1. When the CR and the TL are different from each other
   A. Mode 2: TL mode
   B. When the CR and the TL are the PLANAR mode and the DC mode
    i. Mode 3: VERTICAL mode
    ii. Mode 4: HORIZONTAL mode
    iii. Mode 5: right upward diagonal mode
   A. When the CR and the TL are neither the PLANAR mode nor the DC mode
    i. Mode 3: PLANAR mode
    ii. Mode 4: DC mode
    iii. Mode 5: CR−1 mode
   C. Other cases (i.e., one of the CR and the TL is the PLANAR mode or the DC mode)
    i. Mode 3: !(the smaller mode between the CR and the TL)
    ii. Mode 4: (the larger mode between the CR and the TL)−1
    iii. Mode 5: (the greater mode between the CR and the TL)+1
  2. When the CR and the TL are the same
   A. When the CR is the PLANAR mode or the DC mode
    i. Mode 2: !CR
    ii. Mode 3: VERTICAL mode
    iii. Mode 4: HORIZONTAL mode
    iv. Mode 5: right upward diagonal mode
   B. Other cases
    i. Mode 2: PLANAR mode
    ii. Mode 3: DC mode
    iii. Mode 4: CR−1 mode
    iv. Mode 5: CR+1 mode This is described with reference to FIG. 29 as follows.

After the CR and the TL are derived, a process of selecting a chroma intra prediction mode is performed, and first, it may be determined whether or not the CR and the TL are the same (S2900).

If the CR and the TL are the same, it is determined whether or not the CR is less than 2, that is, whether it is the PLANAR mode or the DC mode (S2910).

If the CR is less than 2, the chroma intra prediction candidate may include the DM (CR), the !CR, the VERTICAL mode, the HORIZONTAL mode, and the right upward diagonal mode (S2920).

If the CR is not less than 2, the chroma intra prediction candidates may include the DM(CR), the PLANAR mode, the DC mode, the CR−1, and the CR+1 (S2930).

In contrast, if the CR and the TL are not the same, it may be determined whether or not CR+TL is less than 2 (S2940). That is, it is determined whether the CR and the TL are the PLANAR mode or the DC mode.

As a result of the determination, if CR+TL is less than 2, the chroma intra prediction candidates may include the DM (CR), the TL, the VERTICAL mode, the HORIZONTAL mode, and the right upward diagonal mode (S2950).

On the other hand, if CR+TL is not less than 2, it may be determined whether or not the CR is greater than No. 1 mode and the TL is greater than No. 1 mode (S2960). That is, it is determined whether or not the CR and the TL that are not the same are a mode of a number greater than that of the PLANAR mode or the DC mode.

As a result of the determination, if the CR is greater than No. 1 mode and the TL is greater than No. 1 mode, that is, if both the CR and the TL are a mode of a number greater than that of the PLANAR mode or the DC mode, then the chroma intra prediction candidates may include the DM (CR), the TL, the PLANAR mode, the DC mode, and CR−1 mode (S2970).

On the other hand, if the CR is greater than No. 1 mode and the TL is not greater than No. 1 mode, that is, if either the CR or the TL is the PLANAR mode or the DC mode, and the rest is a mode of a number greater than that of the PLANAR mode or the DC mode, then the chroma intra prediction candidates may include the DM(CR), the TL, !(the smaller mode between CR and TL) (!min(CR, TL)), (the greater mode between CR and TL)−1 (max(CR, TL)−1), (the greater mode between CR and TL)+1 (max(CR, TL)+1) mode (S2980).

The intra prediction modes included in the chroma intra prediction candidate may be added to the chroma intra prediction candidate list in order of from mode 1 to mode 5.

Further, according to another example, the chroma intra prediction mode is summarized as follows. According to this embodiment, five prediction candidate modes may be included in the chroma intra prediction mode candidate list.
 –Mode 1: DM mode
  1. When the CR and the TL are different from each other
   A. Mode 2: TL mode
   B. When the CR and the TL are the PLANAR mode and the DC mode
    i. Mode 3: VERTICAL mode
    ii. Mode 4: HORIZONTAL mode
    iii. Mode 5: diagonal (DIAGONAL) mode (No. 34 mode)
   C. When the CR and the TL are neither the PLANAR mode nor the DC mode
    i. Mode 3: PLANAR mode
    ii. Mode 4: DC mode
    iii. Mode 5: If the CR−1 and the TL are the same, the CR+1, or if not, the CR−1
   D. Other cases (i.e., one of the CR and the TL is the PLANAR mode or the DC mode)
    i. Mode 3: !(the smaller mode between the CR and the TL)
    ii. Mode 4: (the larger mode between the CR and the TL)−1
    iii. Mode 5: (the greater mode between the CR and the TL)+1
  2. When the CR and the TL are the same
   A. When the CR is the PLANAR mode or the DC mode
    i. Mode 2: !CR
    ii. Mode 3: VERTICAL mode
    iii. Mode 4: HORIZONTAL mode
    iv. Mode 5: diagonal mode B. Other cases
 i. Mode 2: CR−1 mode
 ii. Mode 3: CR+1 mode
 iii. Mode 4: PLANAR mode
 iv. Mode 5: DC mode This is described with reference to FIG. 30 as follows.

After the CR and the TL are derived, a process of selecting a chroma intra prediction mode is performed, and first, it may be determined whether or not the CR and the TL are the same (S3000).

If the CR and the TL are the same, it is determined whether or not the CR is less than 2, that is, whether it is the PLANAR mode or the DC mode (S3010).

If the CR is less than 2, the chroma intra prediction candidate may include the DM (CR), the !CR, the VERTICAL mode, the HORIZONTAL mode, and the diagonal mode (S3020).

If the CR is not less than 2, the chroma intra prediction candidates may include the DM(CR), the CR−1 mode, the CR+1 mode, the PLANAR mode, and the DC mode (S3030).

In contrast, if the CR and the TL are not the same, it may be determined whether or not CR+TL is less than 2 (S3040). That is, it is determined whether the CR and the TL are the PLANAR mode or the DC mode.

As a result of the determination, if CR+TL is less than 2, the chroma intra prediction candidates may include the DM (CR), the TL, the VERTICAL mode, the HORIZONTAL mode, and the diagonal mode (S3050).

On the other hand, if CR+TL is not less than 2, it may be determined whether or not the CR is greater than No. 1 mode and the TL is greater than No. 1 mode (S3060). That is, it is determined whether or not the CR and the TL that are not the same are a mode of a number greater than that of the PLANAR mode or the DC mode.

As a result of the determination, if the CR is greater than No. 1 mode and the TL is greater than No. 1 mode, that is, if both the CR and the TL are a mode of a number greater than that of the PLANAR mode or the DC mode, then the chroma intra prediction candidates may include the DM(CR), the TL, the PLANAR mode, the DC mode, CR+1 when CR−1 mode and the TL are the same, and CR−1 mode in other cases (CR−1==TL?(CR+1: CR−1)) (S3070).

On the other hand, if the CR is greater than No. 1 mode and the TL is not greater than No. 1 mode, that is, if either the CR or the TL is the PLANAR mode or the DC mode, and the rest is a mode of a number greater than that of the PLANAR mode or the DC mode, then the chroma intra prediction candidates may include the DM(CR), the TL, !(the smaller mode between CR and TL) (!min(CR, TL)), (the greater mode between CR and TL)−1 (max(CR, TL)−1), (the greater mode between CR and TL)+1 (max(CR, TL)+1) mode (S3080).

The intra prediction modes included in the chroma intra prediction candidate may be added to the chroma intra prediction candidate list in order of from mode 1 to mode 5.

Further, according to another example, the chroma intra prediction mode is summarized as follows. According to this embodiment, three prediction candidate modes may be included in the chroma intra prediction mode candidate list.
 −Mode 1: DM mode
 1. When the CR and the TL are different from each other
 A. Mode 2: TL mode
 B. When there is no PLANAR mode among the CR and the TL
 i. Mode 3: PLANAR mode
 C. When there is the DC mode among the CR and the TL
 i. Mode 3: VERTICAL mode
 D. Other cases
 i. Mode 3: DC mode
 2. When the CR and the TL are the same
 A. When the CR is the PLANAR mode or the DC mode
 i. Mode 2: !CR
 ii. Mode 3: VERTICAL mode
 B. Other cases
 i. Mode 2: CR−1 mode
 ii. Mode 3: CR+1 mode This is described with reference to FIG. 31 as follows.

After the CR and the TL are derived, a process of selecting a chroma intra prediction mode is performed, and first, it may be determined whether or not the CR and the TL are the same (S3100).

If the CR and the TL are the same, it is determined whether or not the CR is less than 2, that is, whether it is the PLANAR mode or the DC mode (S3110).

If the CR is less than 2, the chroma intra prediction candidate may include the DM (CR), the !CR, and the VERTICAL mode (S3120).

If the CR is not less than 2, the chroma intra prediction candidates may include the DM (CR), the CR−1 mode, and the CR+1 mode (S3130).

In contrast, if the CR and the TL are not the same, it may be determined whether either the CR or the TL is the PLANAR mode (CR && TL) (S3140).

As a result of the determination, if either the CR or the TL is not the PLANAR mode, the chroma intra prediction candidate may include the DM (CR), the TL, and the PLANAR mode (S3150).

In contrast, if either the CR or the TL is the PLANAR mode, it may be determined whether or not CR+TL is smaller than No. 2 mode (S3160). That is, it is determined whether either the CR or the TL is the DC mode.

As a result of the determination, if either the CR or the TL is the PLANAR mode, and the other is the DC mode, then the chroma intra prediction candidate may include the DM (CR), the TL, and the VERTICAL mode (S3170).

On the other hand, if CR+TL is greater than No. 2 mode, that is, either the CR or the TL is the PLANAR mode, and the other is not the DC mode, then the chroma intra prediction candidate may include the DM (CR), the TL, and the DC mode (S3180).

The intra prediction modes included in the chroma intra prediction candidate may be added to the chroma intra prediction candidate list in order of from mode 1 to mode 3.

Further, according to another example, the chroma intra prediction mode is summarized as follows. According to this embodiment, three prediction candidate modes may be included in the chroma intra prediction mode candidate list.
 −Mode 1: DM mode
 1. When the CR and the TL are different from each other
 A. Mode 2: TL mode
 B. When there is no PLANAR mode among the CR and the TL
 i. Mode 3: PLANAR mode
 C. When there is the DC mode among the CR and the TL
 i. Mode 3: VERTICAL mode
 D. Other cases
 i. Mode 3: DC mode
 2. When the CR and the TL are the same
 A. When the CR is the PLANAR mode or the DC mode
 i. Mode 2: !CR
 ii. Mode 3: VERTICAL mode
 B. Other cases
 i. Mode 2: CR−1 mode ii. Mode 3: PLANAR mode This is described with reference to FIG. 32 as follows.

After the CR and the TL are derived, a process of selecting a chroma intra prediction mode is performed, and first, it may be determined whether or not the CR and the TL are the same (S3200).

If the CR and the TL are the same, it is determined whether or not the CR is less than 2, that is, whether it is the PLANAR mode or the DC mode (S3210).

If the CR is less than 2, the chroma intra prediction candidate may include the DM (CR), the !CR, and the VERTICAL mode (S3220).

If the CR is not less than 2, the chroma intra prediction candidates may include the DM (CR), the CR−1 mode, and the PLANAR mode (S3230).

In contrast, if the CR and the TL are not the same, it may be determined whether either the CR or the TL is the PLANAR mode (CR && TL) (S3240).

As a result of the determination, if either the CR or the TL is not the PLANAR mode, the chroma intra prediction candidate may include the DM (CR), TL, and PLANAR mode (S3250).

In contrast, if either the CR or the TL is the PLANAR mode, it may be determined whether or not CR+TL is smaller than No. 2 mode (S3260). That is, it is determined whether either the CR or the TL is the DC mode.

As a result of the determination, if either the CR or the TL is the PLANAR mode, and the other is the DC mode, then the chroma intra prediction candidate may include the DM (CR), the TL, and the VERTICAL mode (S3270).

On the other hand, if CR+TL is greater than No. 2 mode, that is, either the CR or the TL is the PLANAR mode, and the other is not the DC mode, then the chroma intra prediction candidate may include the DM(CR), the TL, and the DC mode (S3280).

The intra prediction modes included in the chroma intra prediction candidate may be added to the chroma intra prediction candidate list in order of from mode 1 to mode 3.

Further, according to another example, the chroma intra prediction mode is summarized as follows. According to this embodiment, three prediction candidate modes may be included in the chroma intra prediction mode candidate list.

–Mode 1: DM mode
1. When the CR and the TL are different from each other
A. Mode 2: TL mode
B. When there is no PLANAR mode among the CR and the TL
  i. Mode 3: PLANAR mode
C. When there is the DC mode among the CR and the TL
  i. Mode 3: HORIZONTAL mode
D. Other cases
  i. Mode 3: DC mode
2. When the CR and the TL are the same
A. When the CR is the PLANAR mode or the DC mode
  i. Mode 2: !CR
  ii. Mode 3: VERTICAL mode
B. Other cases
  i. Mode 2: PLANAR mode
  ii. Mode 3: DC mode This is described with reference to FIG. 33 as follows.

After the CR and the TL are derived, a process of selecting a chroma intra prediction mode is performed, and first, it may be determined whether or not the CR and the TL are the same (S3300).

If the CR and the TL are the same, it is determined whether or not the CR is less than 2, that is, whether it is the PLANAR mode or the DC mode (S3310).

If the CR is less than 2, the chroma intra prediction candidate may include the DM(CR), the !CR, and the VERTICAL mode (S3320).

If the CR is not less than 2, the chroma intra prediction candidates may include the DM(CR), the PLANAR mode, and the DC mode (S3330).

In contrast, if the CR and the TL are not the same, it may be determined whether either the CR or the TL is the PLANAR mode (CR && TL) (S3340).

As a result of the determination, if either the CR or the TL is not the PLANAR mode, the chroma intra prediction candidate may include the DM (CR), TL, and PLANAR mode (S3350).

In contrast, if either the CR or the TL is the PLANAR mode, it may be determined whether or not CR+TL is smaller than No. 2 mode (S3360). That is, it is determined whether either the CR or the TL is the DC mode.

As a result of the determination, if either the CR or the TL is the PLANAR mode, and the other is the DC mode, then the chroma intra prediction candidate may include the DM (CR), the TL, and the HORIZONTAL mode (S3370).

On the other hand, if CR+TL is greater than No. 2 mode, that is, either the CR or the TL is the PLANAR mode, and the other is not the DC mode, then the chroma intra prediction candidate may include the DM(CR), the TL, and the DC mode (S3380).

The intra prediction modes included in the chroma intra prediction candidate may be added to the chroma intra prediction candidate list in order of from mode 1 to mode 3.

By adaptively selecting a chrominance intra prediction mode candidate as in the embodiment described with reference to FIGS. 28 to 33, it is possible to improve the prediction accuracy and increase the coding efficiency.

Figure 31:
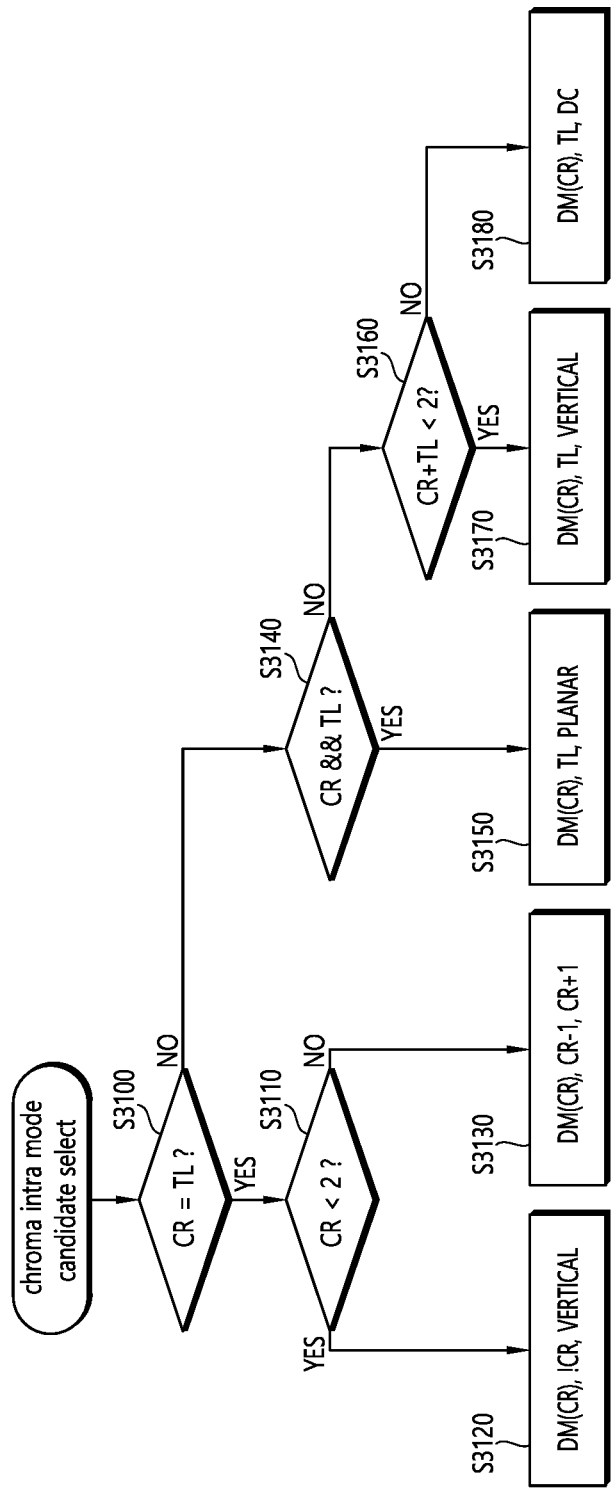
FIG. 31 is a control flowchart illustrating a deriving method according to still another embodiment for the chroma intra prediction mode selection position of FIG. 27.
Figure 32:
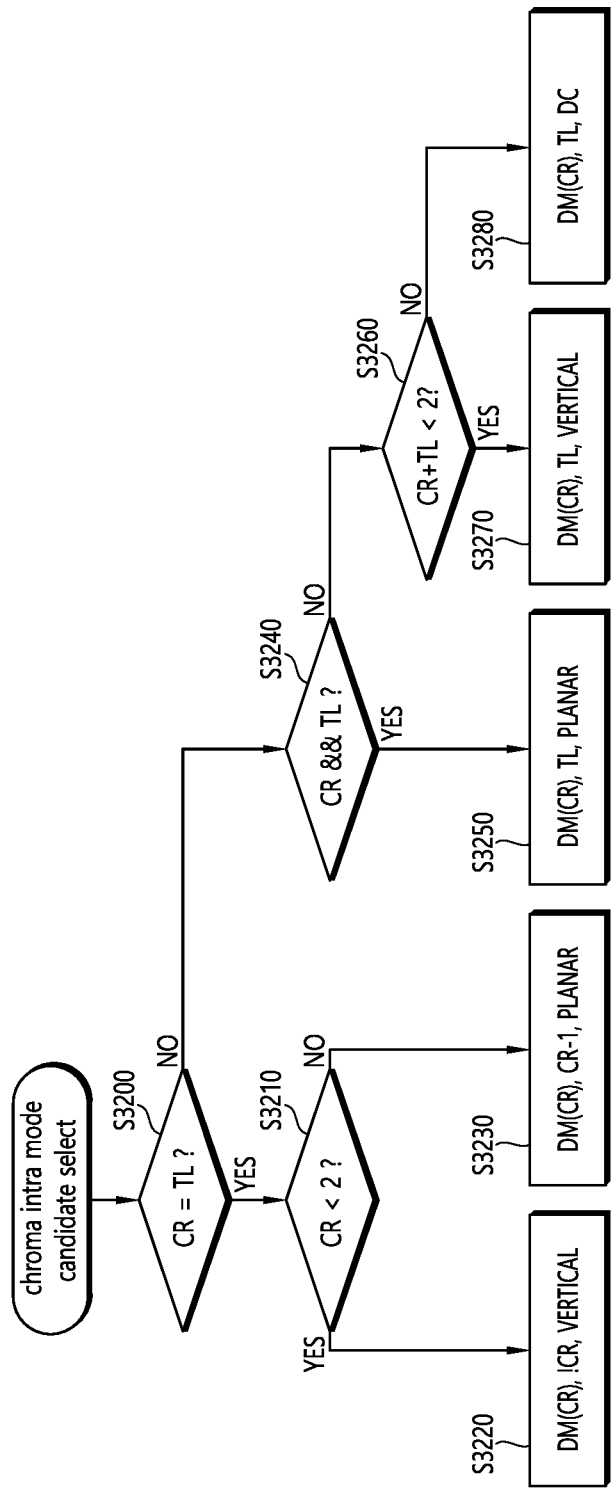
FIG. 32 is a control flowchart illustrating a deriving method according to still another embodiment for the chroma intra prediction mode selection position of FIG. 27.

Tables 8 and 9 below show results of encoding experiments according to the intra prediction method described with reference to FIGS. 28 and 31, respectively. In the experiment of Table 8, the anchor is VTM3.0, and the experiment was conducted in the All Intra experiment environment. And, in the experiment of Table 9, the anchor is VTM3.0rc1, and the experiment was conducted in the All Intra experiment environment.

TABLE 8

| | All Intra Main10 | | |
| --- | --- | --- | --- |
| | | | Over VTM-3.0 |
| | Y | U | V |
| Class A1 | −0.05% | −0.54% | −0.64% |
| Class A2 | −0.02% | −0.65% | −0.54% |
| Class B | −0.02% | −0.81% | −0.83% |
| Class C | −0.03% | −0.79% | −0.94% |
| Class E | −0.03% | −1.36% | −0.97% |
| Overall | −0.03% | −0.83% | −0.80% |
| Class D | 0.00% | −0.41% | −0.42% |
| Class F | −0.02% | −0.53% | −0.55% |

TABLE 9

| | All Intra Main10 | | | | |
| --- | --- | --- | --- | --- | --- |
| | | | Over VTM-3.0 | | |
| | Y | U | V | EncT | DecT |
| Class A1 | −0.03% | −0.22% | −0.25% | 97% | 100% |
| Class A2 | 0.02% | −0.34% | −0.25% | 95% | 99% |
| Class B | −0.02% | −0.38% | −0.34% | 97% | 96% |
| Class C | −0.05% | −0.29% | −0.33% | 97% | 97% |

TABLE 9-continued

| | All Intra Main10 | | | | |
|---|---|---|---|---|---|
| | | Over VTM-3.0 | | | |
| | Y | U | V | EncT | DecT |
| Class E | 0.00% | −0.95% | −0.24% | 97% | 95% |
| Overall | −0.02% | −0.42% | −0.29% | 96% | 97% |
| Class D | −0.03% | 0.03% | −0.01% | 99% | 99% |
| Class F | 0.01% | −0.12% | −0.17% | 96% | 96% |

Figure 28:
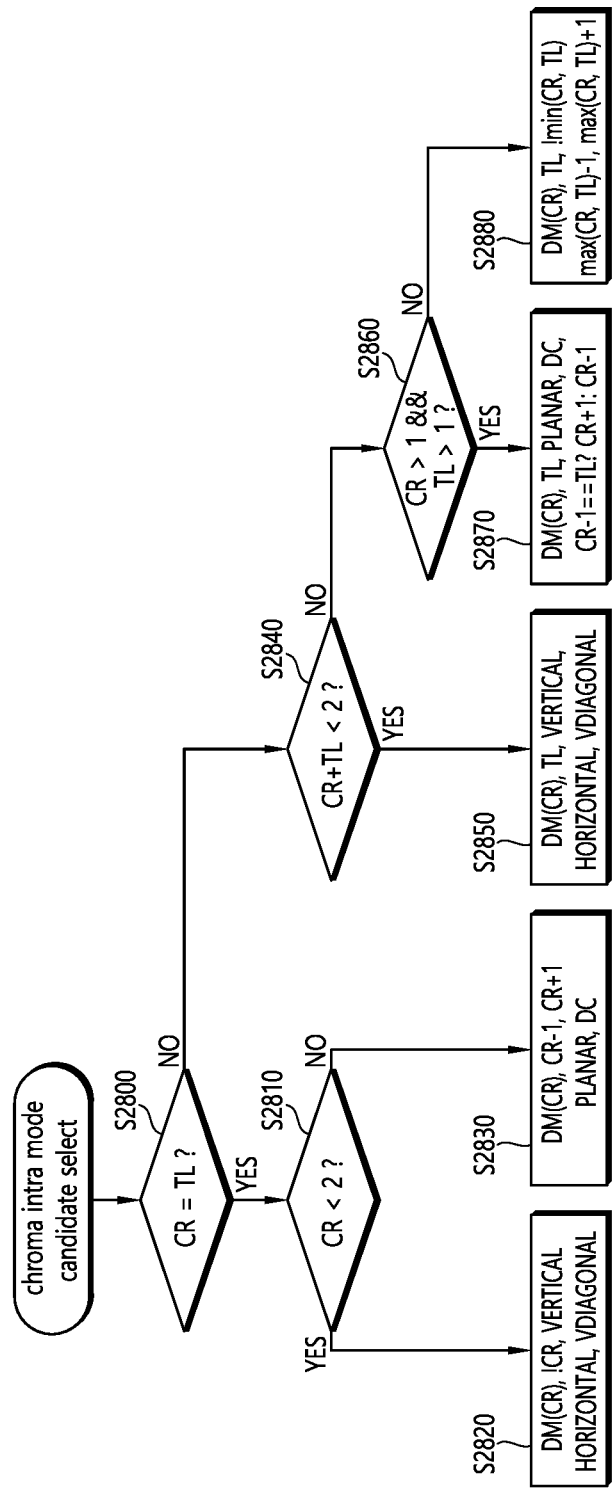
FIG. 28 is a control flowchart illustrating a deriving method according to an embodiment for the chroma intra prediction mode selection position of FIG. 27.
Figure 29:
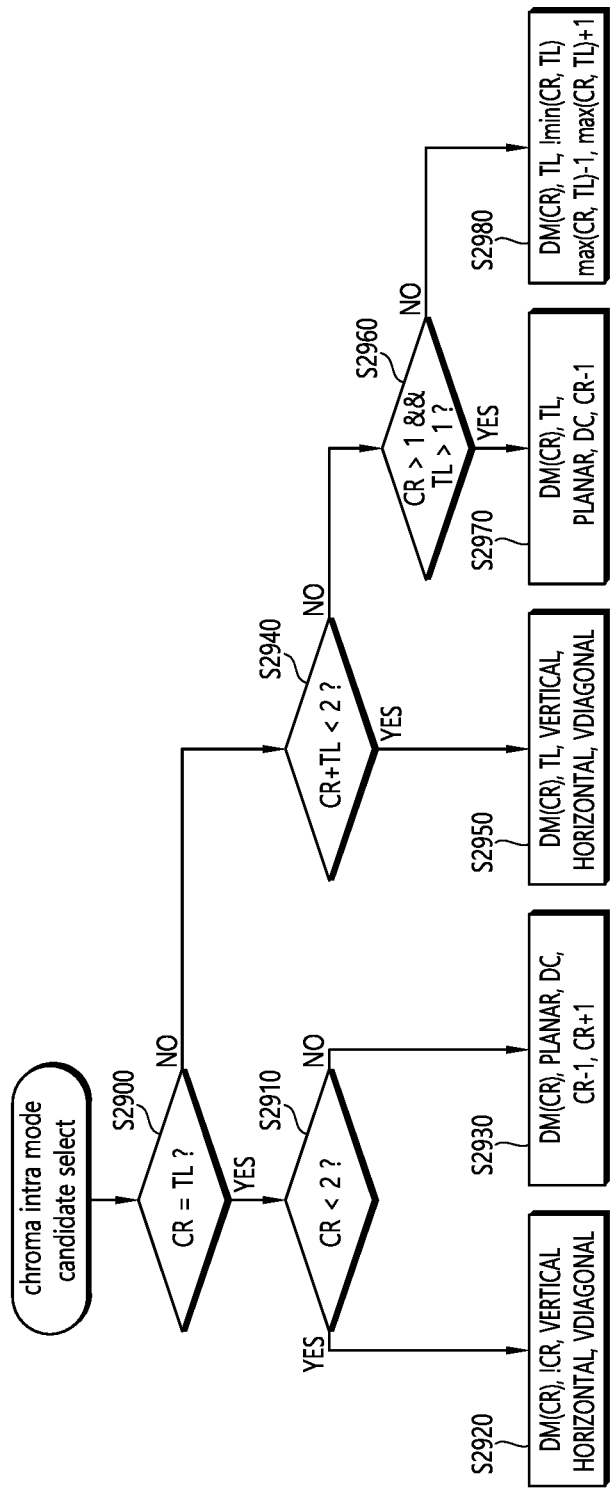
FIG. 29 is a control flowchart illustrating a deriving method according to another embodiment for the chroma intra prediction mode selection position of FIG. 27.
Figure 30:
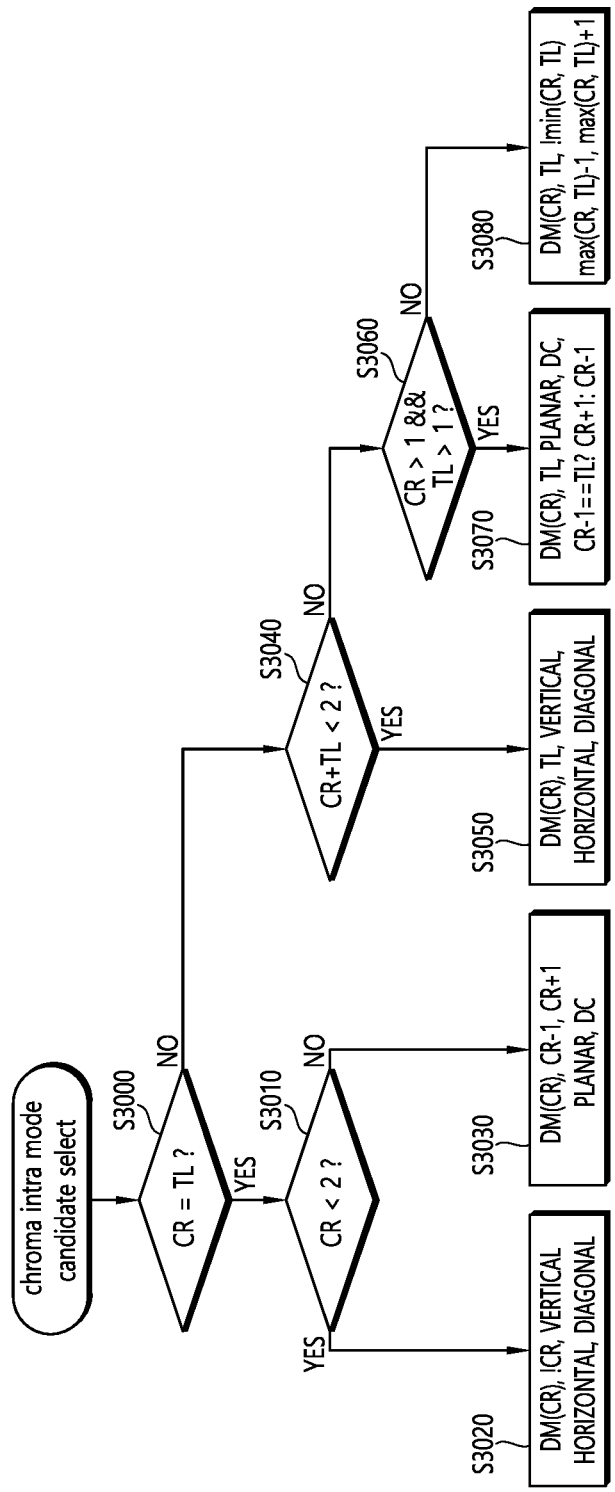
FIG. 30 is a control flowchart illustrating a deriving method according to still another embodiment for the chroma intra prediction mode selection position of FIG. 27.
Figure 33:
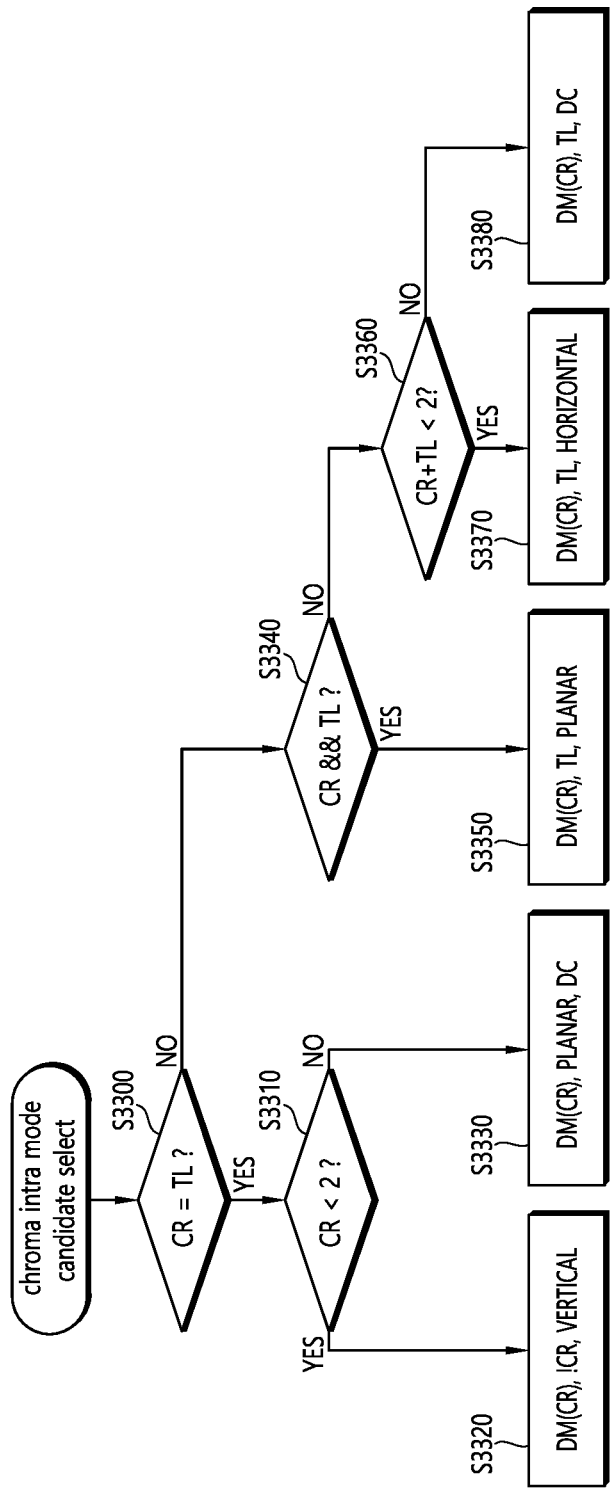
FIG. 33 is a control flowchart illustrating a deriving method according to still another embodiment for the chroma intra prediction mode selection position of FIG. 27.

As shown in Table 8, when the intra prediction method proposed in FIG. 28 is applied, it is possible to obtain BD-rate gains of Y 0.03%, Cb 0.83%, and Cr 0.80%, and when the intra prediction method proposed in FIG. 33 is applied, it is possible to obtain BD-rate gains of Y 0.02%, Cb 0.42%, and Cr 0.29%, while at the same time reducing the complexity of the encoder by 4%.

The chroma intra prediction method according to the embodiment described with reference to FIGS. 28 to 33 exhibits high efficiency when the block structures of the luminance block and the chrominance block are different from each other during intra prediction. In the current VTM3.0, since the coding unit applied during intra prediction in an inter prediction slice or tile has the luminance block and the chrominance block of the same block structure, the efficiency of the intra prediction method proposed above may be slightly reduced. Therefore, according to an embodiment, for an intra prediction coding unit in an inter prediction slice or tile, the following chroma intra prediction mode candidate generation method may be proposed.

1. When performing prediction for all intra slice or intra tile prediction coding units, chroma intra prediction mode candidates are generated through the proposed method (embodiments described with reference to FIGS. 28 to 33).
2. When performing prediction for intra slices or intra tile prediction coding units, chroma intra prediction mode candidates are generated through the proposed method (embodiments described with reference to FIGS. 28 to 33), and, when performing prediction for inter slice or intra tile prediction coding units, chroma intra prediction mode candidates are selected through the method of VTM3.0 (an embodiment described with reference to FIG. 10).

Unlike the existing MDMS of Embodiment 1, the method proposed in this embodiment can use in the same manner the structure of the method for generating an intra prediction mode candidate of a chrominance block of the existing (VTM3.0), and can also use the DM index (DM_CHROMA_IDX) in the same manner In the VTM3.0, since DM_CHROMA_IDX is also used for multi-hypothesis intra/inter of inter prediction, encoding and decoding errors occur when the existing MDMS method is used as it is.

Further, in the method proposed in this embodiment, when the intra prediction mode of the chrominance block is binarized, the prediction method in the embodiment described with reference to FIG. 10 is used as it is, and thus the method of this embodiment exhibits excellent compatibility with the existing structure and does not cause disadvantages, such as an increase in context modeling.

Meanwhile, the following embodiment proposes another method of partially applying the MDMS of the embodiment described with reference to FIG. 10 based on the VTM3.0 chrominance image intra prediction structure.

When performing chrominance image intra prediction of the current VTM3.0, five intra prediction directions shown in FIG. 13 may be selected. Meanwhile, in this embodiment, the CCLM mode may be omitted.

1. DM mode
2. PLANAR mode
3. VERTICAL mode
4. HORIZONTAL mode
5. DC mode

As shown in FIG. 26, the DM mode refers to an intra prediction mode of a luminance block located in the middle (CR) in the co-located luminance block of the current chrominance block, and then selects four predetermined intra prediction modes (PLANAR mode, VERTICAL mode, HORIZONTAL mode, DC mode). The CR may indicate the bottom-right sample position among the four samples, which is located at the center of the target block.

When the intra prediction mode of the DM mode is the same as any one of the rest four basic intra prediction modes, this intra prediction mode may be replaced with a right upward diagonal (VDIAGONAL) mode (e.g., in the case of No. 67 intra prediction mode, No. 66 mode).

Such method of generating a chrominance image intra prediction mode is effective when the luminance and chrominance block structures are the same during intra prediction as in the conventional HEVC, but, if the luminance block and the chrominance block are separated like VTM3.0 of the current VVC, the efficiency may decrease. That is, since the luminance block corresponding to the current chrominance block is constructed with several smaller luminance block structures, DM prediction accuracy may be reduced.

An embodiment of this document proposes a method of adaptively selecting an intra prediction mode candidate by referring to multiple positions of a luminance block corresponding to a current chrominance block when selecting an intra prediction mode candidate of a chrominance block. Through this, even when the luminance block and the chrominance block are separated, the DM prediction accuracy and coding efficiency can be improved.

According to an embodiment, a method of generating chroma intra prediction mode candidates using intra prediction modes of luminance blocks corresponding to the TR, BL, and BR positions in addition to the TL position of the embodiments described with reference to FIGS. 28 to 33 is proposed. That is, as shown in FIG. 13, by using the intra prediction modes of the luminance blocks corresponding to the TR, BL, and BR positions, chrominance intra prediction mode candidates may be generated as follows.

1. By using the intra prediction modes of the CR and TR positions, the chrominance intra prediction mode candidate is selected. The selection method is the same as the embodiments described with reference to FIGS. 28 to 33, and the chroma intra prediction mode candidate is selected by changing TL to TR in the embodiments described with reference to FIGS. 28 to 33.
2. By using the intra prediction modes of the CR and BL positions, the chroma intra prediction mode candidate is selected. The selection method is the same as the embodiments described with reference to FIGS. 28 to 33, and the chroma intra prediction mode candidate is selected by changing TL to BL in the embodiments described with reference to FIGS. 28 to 33.
3. By using the intra prediction modes of the CR and BL positions, the chroma intra prediction mode candidate is selected. The selection method is the same as the embodiments described with reference to FIGS. 28 to 33, and the chroma intra prediction mode candidate is selected by changing TL to BR in the embodiments described with reference to FIGS. 28 to 33.

Alternatively, the DM position may be adaptively selected as follows according to the shape and size of the current chrominance block.

1. When the current chrominance blocks HORIZONTAL length is equal to or greater than two times the VERTICAL length, the chroma intra prediction mode candidate is selected by using the intra prediction modes of the TL and TR positions. The selection method is the same as the embodiments described with reference to FIGS. 28 to 33, and the chroma intra prediction mode candidate is selected by changing CR to TL, and TL to TR in the embodiments described with reference to FIGS. 28 to 33.

2. When the current chrominance blocks VERTICAL length is equal to or greater than two times the HORIZONTAL length, the chroma intra prediction mode candidate is selected by using the intra prediction modes of the CR and BL positions. The selection method is the same as the embodiments described with reference to FIGS. 28 to 33, and the chroma intra prediction mode candidate is selected by changing CR to TL, and TL to BL in the embodiments described with reference to FIGS. 28 to 33.

3. In other cases, the same method as in the embodiments described with reference to FIGS. 28 to 33 is applied.

As described in the various embodiments above, by adaptively referring to various DM positions, it is possible to efficiently select a chroma intra prediction mode for various block shapes, through which coding efficiency can be increased.

Figure 34:
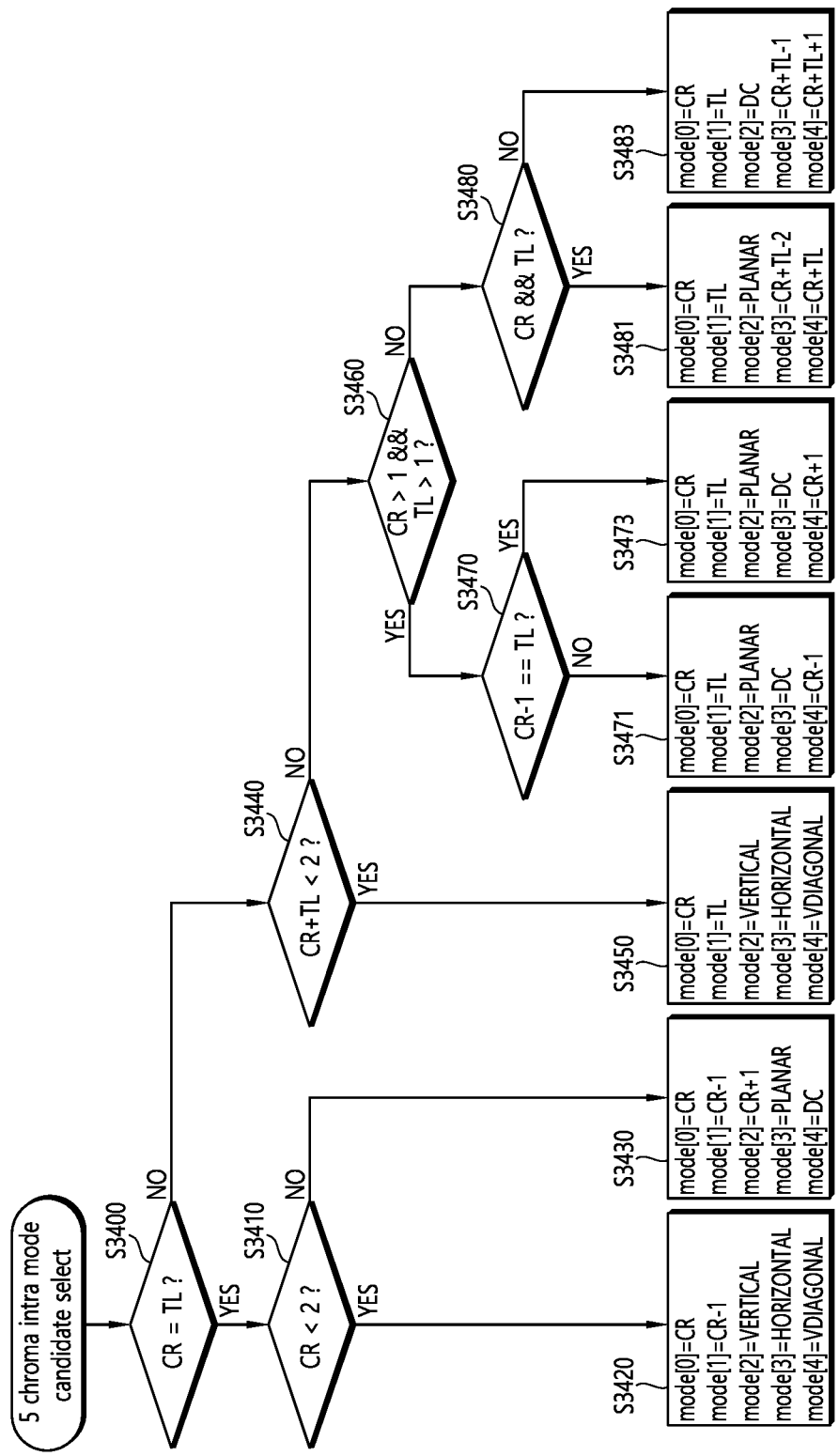
FIG. 34 is a control flowchart illustrating a method of deriving five chroma intra candidate modes according to an example of this document.
Figure 35:
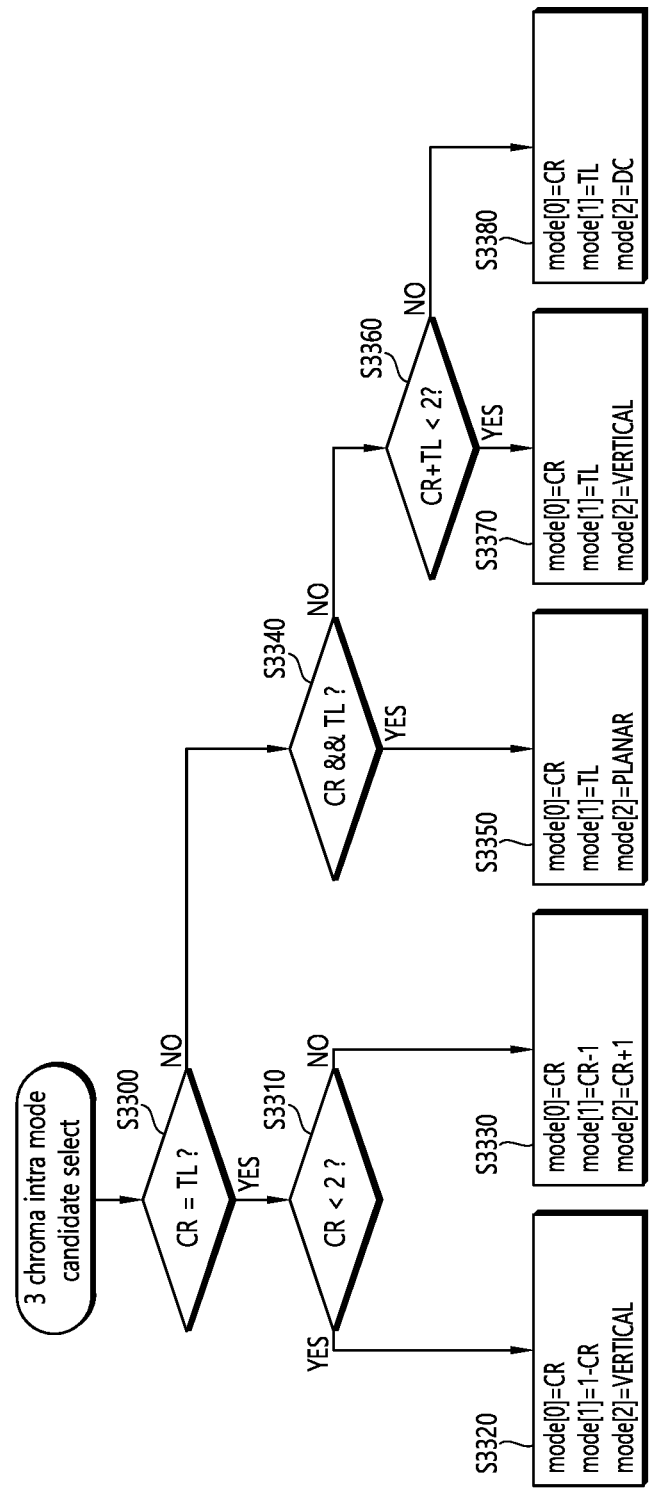
FIG. 35 is a control flowchart illustrating a method of deriving three chroma intra candidate modes according to an example of this document.

Meanwhile, when using the DM at the position shown in FIG. 27, that is, DM in two positions of CR and TL, for chroma intra prediction, it is possible to construct five or three chroma intra candidate modes, and the chroma intra candidate mode list may be generated through the processes as in FIGS. 34 and 35.

FIG. 34 is a control flowchart illustrating a method of deriving five chroma intra candidate modes.

First, the luminance intra mode at the CR position is selected as five chroma intra candidate modes as the DM.

Thereafter, the rest four chroma intra candidate modes may be derived from the two DMs, CR and TL, through a condition check process shown in the drawing.

After the CR and the TL are derived, a process of selecting a chroma intra prediction mode is performed, and first, it may be determined whether or not the CR and the TL are the same (S3400).

If the CR and the TL are the same, it is determined whether or not the CR is less than 2, that is, whether it is the PLANAR mode or the DC mode (S3410).

If the CR is less than 2, the chroma intra prediction candidate may include the CR, the CR−1 mode, the VERTICAL mode, the HORIZONTAL mode, and the right upward diagonal mode (S3420).

If the CR is not less than 2, the chroma intra prediction candidates may include the CR, the CR−1 mode, the CR+1 mode, the PLANAR mode, and the DC mode (S3430).

In contrast, if the CR and the TL are not the same, it may be determined whether or not CR+TL is less than 2 (S3440). That is, it is determined whether the CR and the TL are the PLANAR mode or the DC mode.

As a result of the determination, if CR+TL is less than 2, the chroma intra prediction candidates may include the CR, the TL, the VERTICAL mode, the HORIZONTAL mode, and the right upward diagonal mode (S3450).

On the other hand, if CR+TL is not less than 2, it may be determined whether or not the CR is greater than No. 1 mode and the TL is greater than No. 1 mode (S3460). That is, it is determined whether or not the CR and the TL that are not the same are a mode of a number greater than that of the PLANAR mode or the DC mode.

As a result of the determination, if the CR is greater than No. 1 mode and the TL is greater than No. 1 mode, that is, if both the CR and the TL are a mode of a number greater than that of the PLANAR mode or the DC mode, then it is determined whether the CR−1 mode and the TL are the same (S3470).

If the CR−1 mode and the TL are not the same, the chroma intra prediction candidate may include the CR, the TL, the PLANAR mode, the DC mode, and the CR−1 mode (S3471), and if the CR−1 mode and the TL are the same, the chroma intra prediction candidate may include the CR, the TL, the PLANAR mode, the DC mode, and the CR+1 mode (S3473).

Meanwhile, unless the CR is greater than No. 1 mode and the TL is greater than No. 1 mode, it may be determined whether one of the CR and the TL is a PLANAR mode or a DC mode (3480).

As a result of the determination, if one of the CR and the TL is the DC mode, the chroma intra prediction candidate may include the CR, the TL, the PLANAR mode, DC+TL−2 mode, and DC+TL mode (S3481).

In contrast, if one of the CR and the TL is the PLANAR mode, the chroma intra prediction candidate may include the CR, the TL, the DC mode, DC+TL−1 mode, and DC+TL+1 mode (S3483).

The intra prediction modes included in the chroma intra prediction candidate may be added to the chroma intra prediction candidate list in order of from mode 1 to mode 5.

Mode coding (binarization, context coding (or bypass coding) and parsing order) for the chroma intra mode including CCML is the same as in VTM3.0 described above.

FIG. 35 is a control flowchart illustrating a method of deriving three chroma intra candidate modes.

As shown, after the CR and the TL are derived, a process of selecting a chroma intra prediction mode is performed, and first, it may be determined whether or not the CR and the TL are the same (S3500).

If the CR and the TL are the same, it is determined whether or not the CR is less than 2, that is, whether it is the PLANAR mode or the DC mode (S3510).

If the CR is less than 2, the chroma intra prediction candidate may include the DM (CR), the CR−1, and the VERTICAL mode (S3520).

If the CR is not less than 2, the chroma intra prediction candidates may include the CR, the CR−1 mode, and the CR+1 mode (S3530).

In contrast, if the CR and the TL are not the same, it may be determined whether either the CR or the TL is the PLANAR mode (CR && TL) (S3540).

As a result of the determination, if either the CR or the TL is not the PLANAR mode, the chroma intra prediction candidate may include the CR, the TL, and the PLANAR mode (S3550).

In contrast, if either the CR or the TL is the PLANAR mode, it may be determined whether or not CR+TL is smaller than No. 2 mode (S3560). That is, it is determined whether either the CR or the TL is the DC mode.

As a result of the determination, if either the CR or the TL is the PLANAR mode, and the other is the DC mode, then the chroma intra prediction candidate may include the CR, the TL, and the VERTICAL mode (S3570).

On the other hand, if CR+TL is greater than No. 2 mode, that is, either the CR or the TL is the PLANAR mode, and the other is not the DC mode, then the chroma intra prediction candidate may include the CR, the TL, and the DC mode (S3580).

The intra prediction modes included in the chroma intra prediction candidate may be added to the chroma intra prediction candidate list in order of from mode 1 to mode 3.

Hereinafter, Tables 10 and 11 show the complexity analysis of deriving chroma intra prediction candidates according to FIGS. 34 and 35 except three VTM3, JEM MDMS, and CCLM predictions.

TABLE 10

|  | Max number of Luma DM point to access | Max number of neighbors to access | Max layers of if conditions | Max number of comparison operator | Max number of logical operators | Max number of assignment operators |
|---|---|---|---|---|---|---|
| VTM3 | 1 | 0 | 1 | 5 | 0 | 15 |
| Test3.3.1 | 2 | 0 | 4 | 4 | 2 | 13 |
| Test3.3.2 | 2 | 0 | 3 | 3 | 1 | 12 |
| JEM MDMS | 5 | 5 | 4 | 39 | 28 | 80 |

TABLE 11

|  | Max number of increments | Max number of bit operation | Number of Context coded bins | number of full RDO checks | Has LUT? | LUT Size |
|---|---|---|---|---|---|---|
| VTM3 | 4 | 2 | 1 | 5 | N | 0 |
| Test3.3.1 | 0 | 4 | 1 | 5 | N | 0 |
| Test3.3.2 | 0 | 2 | 1 | 3 | N | 0 |
| JEM MDMS | 5 | 2 | 5 | 5 | Y | 68 |

Additionally, Tables 12 and 13 show results of a chroma intra prediction candidate derivation test result according to FIG. 34 in the construction of AI (All Intra) and RA (Random Access).

TABLE 12

All Intra Main10
Over VTM-3.0

|  | Y | U | V | EncT | DecT |
|---|---|---|---|---|---|
| Class A1 | −0.04% | −0.60% | −0.65% | 100% | 100% |
| Class A2 | −0.02% | −0.69% | −0.56% | 100% | 99% |
| Class B | −0.03% | −0.82% | −0.87% | 100% | 100% |
| Class C | −0.03% | −0.84% | −1.00% | 99% | 100% |
| Class E | −0.02% | −1.47% | −1.06% | 99% | 100% |
| Overall | −0.03% | −0.88% | −0.86% | 100% | 100% |
| Class D | −0.01% | −0.43% | −0.57% | 100% | 99% |
| Class F | −0.01% | −0.50% | −0.53% | 100% | 100% |

TABLE 13

Random access Main10
Over VTM-3.0

|  | Y | U | V | EncT | DecT |
|---|---|---|---|---|---|
| Class A1 | −0.01% | −0.28% | −0.33% | 100% | 100% |
| Class A2 | −0.03% | −0.59% | −0.28% | 100% | 100% |
| Class B | −0.01% | −0.51% | −0.78% | 100% | 99% |
| Class C | 0.00% | −0.45% | −0.43% | 100% | 100% |
| Class E |  |  |  |  |  |
| Overall | −0.01% | −0.46% | −0.50% | 100% | 100% |
| Class D | 0.02% | −0.66% | −0.76% | 100% | 100% |
| Class F | 0.01% | −0.33% | −0.41% | 100% | 100% |

Additionally, Tables 14 and 15 show results of a chroma intra prediction candidate derivation test result according to FIG. 33 in the construction of AI (All Intra) and RA (Random Access).

TABLE 14

All Intra Main10
Over VTM-3.0

|  | Y | U | V | EncT | DecT |
|---|---|---|---|---|---|
| Class A1 | −0.04% | −0.11% | −0.28% | 97% | 100% |
| Class A2 | 0.01% | −0.10% | −0.24% | 96% | 99% |
| Class B | −0.02% | −0.34% | −0.18% | 98% | 99% |
| Class C | −0.04% | −0.25% | −0.27% | 97% | 99% |
| Class E | 0.01% | −0.63% | 0.00% | 98% | 100% |
| Overall | −0.02% | −0.29% | −0.20% | 97% | 100% |
| Class D | −0.02% | 0.02% | 0.02% | 97% | 98% |
| Class F | −0.03% | −0.05% | −0.07% | 97% | 100% |

TABLE 15

Random access Main10
Over VTM-3.0

|  | Y | U | V | EncT | DecT |
|---|---|---|---|---|---|
| Class A1 | −0.02% | −0.14% | −0.19% | 99% | 100% |
| Class A2 | −0.01% | −0.15% | −0.03% | 99% | 99% |
| Class B | 0.00% | −0.07% | −0.12% | 99% | 100% |
| Class C | 0.01% | −0.13% | 0.13% | 99% | 100% |
| Class E |  |  |  |  |  |
| Overall | 0.00% | −0.12% | −0.05% | 99% | 100% |
| Class D | 0.01% | −0.09% | 0.07% | 99% | 101% |
| Class F | 0.00% | −0.10% | 0.07% | 99% | 100% |

The chroma intra prediction method according to the above-described present embodiment is shown in a table as follows.

TABLE 16

10.3 Specification of test 3.3.1
(section 8.2.3 in VVC specification)
Input to this process are:
 a luma location ( xCb, yCb ) specifying the top-left sample of the current chroma coding block
 relative to the top-left luma sample of the current picture,
 a variable cbWidth specifying the width of the current coding block in luma samples.
 a variable cbHeight specifying the height of the current coding block in luma samples.
In this process, the chroma intra prediction mode IntraPredModeC[ xCb ][ yCb ] is derived by the
following ordered steps:
1. The variables dmModeCR and dmModeTL are derived as follows:|
  dmModeCR is set equal to IntraPredModeY[ xCb + cbWidth / 2 ][ yCb + cbHeight / 2 ].
  dmModeTL is set equal to IntraPredModeY[ xCb ][ yCb ].
2. For X being replaced by either 4 or 7, the variable X is derived as follows:
  If sps_cclm_enabled_flag is equal to 0, X is set equal to 4.
  If sps_cclm_enabled_flag is equal to 1, X is set equal to 7.
3. The candModeListC[ x ] with x = 0..X is derived as follows:
  candModeListC[ X ] = dmModeCR   (8-x)
  If dmModeCR is equal to dmModeTL, candModeListC[ x ] with x = 0..3 is derived as
  follows:
   If dmModeCR is greater than 1, the following applies:
    candModeListC[ 0 ] = 2 + ( ( dmModeCR + 61 ) % 64 )   (8-x)
    candModeListC[ 1 ] = 2 + ( ( dmModeCR − 1 ) % 64 )   (8-x)
    candModeListC[ 2 ] = 0   (8-x)
    candModeListC[ 3 ] = 1   (8-x)
  Otherwise (dmModeCR is not greater than 1), the following applies:
   candModeListC[ 0 ] = 1 − dmModeCR   (8-x)
   candModeListC[ 1 ] = 50   (8-x)
   candModeListC[ 2 ] = 18   (8-x)
   candModeListC[ 3 ] = 66   (8-x)
Otherwise (dmModeCR is not equal to dmModeTL), candModeListC[ x ] with x = 0..3 is
derived as follows:
 candModeListC[ 0 ] = dmModeTL
 If dmModeCR + dmModeTL is equal to 1, the following applies:
  candModeListC[ 1 ] = 50   (8-x)
  candModeListC[ 2 ] = 18   (8-x)
  candModeListC[ 3 ] = 66   (8-x)
 Otherwise if dmModeCR and dmModeTL ate both greater than 1, the following
 applies:
  candModeListC[ 1 ] = 0   (8-x)
  candModeListC[ 2 ] = 1   (8-x)
  If 2 + ( ( dmModeCR + 61 ) % 64 ) is equal to dmModeTL, the following
  applies:
   candModeListC[ 3 ] = 2 + ( ( dmModeCR − 1 ) % 64 )   (8-x)
  Otherwise (2 + ( ( dmModeCR ÷ 61 ) %· 64 ) is not equal to dmModeTL), the
  following applies:
   candModeListC[ 3 ] = 2 ÷ ( ( dmModeCR ÷ 61 ) % 64 )   (8-x)
 Otherwise, the following applies:
  If dmModeCR && dmModeTL is equal to 1, the following applies:
   candModeListC[ 1 ] = 0   (8-x)
   candModeListC[ 2 ] = 2 ÷ ( ( dmModeCR ÷ dmModeTL + 60 ) % 64 ) (8-x)
   candModeListC[ 3 ] = 2 ÷ ( ( dmModeCR ÷ dmModeTL − 2 ) % 64 ) (8-x)
   Otherwise (dmModeCR && dmModeTL is equal to 0), the following applies:
   candModeListC[ 1 ] = 1   (8-x)
   candModeListC[ 2 ] = 2 ÷ ( ( dmModeCR ÷ dmModeTL ÷ 61) % 64 ) (8-x)
  candModeListC[ 3 ] = 2 ÷ ( ( dmModeCR ÷ dmModeTL − 1) % 64 )   (8-x)
 If sps_cclm_enabled_flag is equal to 1, candModeListC[ x ] with x = 4..6 is derived as
 follows:
  candModeListC[ 4 ] = 81   (8-x)
  candModeListC[ 5 ] = 82   (8-x)
  candModeListC[ 6 ] = 83   (8-x)
4. IntraPredModeC[ xCb ][ yCb ] is set equal to
 candModeListC[ intra_chroma_pred_mode[ xCb ][ yCb ]].
 10.4 Specification of test 3.3.2
(section 8.2.3 in VVC specification}
Input to this process are:
 a luma location ( xCb, yCb ) specifying the top-left sample of the current chroma coding block.
 relative to the top-left luma sample of the current picture,
 a variable cbWidth specifying the width of the current coding block in luma samples.
 a variable cbHeight specifying the height of the current coding block in luma samples.
In this process, the chroma intra prediction mode IntraPredModeC[ xCb ][ yCb ] is derived by the
following ordered steps:
5. The variables dmModeCR and dmModeTL are derived as follows:
  dmModeCR is set equal to IntraPredModeY[ xCb + cbWidth / 2 ][ yCb + cbHeight / 2 ].
  dmModeTL is set equal to IntraPredModeY[ xCb ][ yCb ].
6. For X being replaced by either 2 or 5, the variable X is derived as follows:
  If sps_cclm_enabled_flag is equal to 0, X is set equal to 2.
  If sps_cclm_enabled_flag is equal to 1, X is set equal to 5.
7.. The candModeListC[ x ] with x = 0..X is derived as follows:
candModeListC[ X ] = dmModeCR   (8-x)
  If dmModeCR is equal to dmModeTL, candModeListC[ x ] with x = 0.1 is derived as TABLE 16-continued

```
follows:
    If dmModeCR is greater than 1, the following applies:
        candModeListC[ 0 ] = 2 + ( ( dmModeCR + 61 ) % 64 )              (8-x)
        candModeListC[ 1 ] = 2 + ( ( dmModeCR − 1) % 64 )                (8-x)
    Otherwise (dmModeCR is not greater than 1), the following applies:
        candModeListC[ 0 ] = 1 −
        dmModeCR                                                          (8-x)
        candModeListC[ 1 ] = 50                                           (8-x)
Otherwise (dmModeCR is not equal to dmModeTL), candModeListC[ x ] with x = 0, 1 is
derived as follows:
    candModeListC[ 0 ] = dmModeTL                                         (8-x)
    If dmModeCR && dmModeTL is equal to 1 the following applies:
        candModeListC[ 1 ] = 0                                            (8-x)
    Otherwise (dmModeCR && dmModeTL is equal to 0), the following applies:
        If dmModeCR + dmModeTL· is greater than 1, the following applies:
            candModeListC[ 1 ] = 1                                        (8-x)
        Otherwise (dmModeCR + dmModeTL is not greater than 1), the following
        applies:
            candModeListC[ 1 ] = 50                                       (8-x)
If sps_cclm_enabled_flag is equal to 1, candModeListC[ x ] with x = 2..4 is derived as
follows:
    candModeListC[ 2 ] = 81                                               (8-x)
    candModeListC[ 3 ] = 82                                               (8-x)
    candModeListC[ 4 ] = 83                                               (8-x)
8. IntraPredModeC[ xCb ][ yCb ] is set equal to
    candModeListC[ intra_chroma_pred_mode[ xCb ][ yCb ]].
```

(section 9.5.3.7 VVC specification)
Input to this process is a request for a binarization for the syntax element intra_chroma_pred_mode. Output of this process is the binarization of the syntax element.
The binarization for the syntax element intra_chroma_pred_mode is specified in Table 9-7 and Table 9-8.

TABLE 9-7

| Binarization for intra_chroma_pred_mode when sps_cclm_enabled_flag is equal to 0 | |
|---|---|
| Value of intra_chroma_pred_mode | Bin string |
| 2 | 0 |
| 0 | 10 |
| 1 | 11 |

TABLE 9-8

| Binarization for intra_chroma_pred_mode when sps_cclm_enabled_flag is equal to 1 | |
|---|---|
| Value of intra_chroma_pred_mode | Bin string |
| 5 | 0 |
| 2 | 10 |
| 3 | 1110 |
| 4 | 1111 |
| 0 | 1100 |
| 1 | 1101 |

The method proposed in this document may be used for a chroma intra prediction mode selection and prediction, and the intra predicted chrominance block may be used to obtain a residual image through a difference from the original image in the encoding apparatus, or used to obtain a reconstructed image through an addition with a residual signal in the decoding apparatus.

As described above, according to this document, a method of efficiently selecting and transmitting a prediction mode during chrominance image intra prediction, and through the optimization of the existing MDMS method, the decoding performance can be satisfied and the complexity problem in hardware implementation can be solved.

Figure 36:
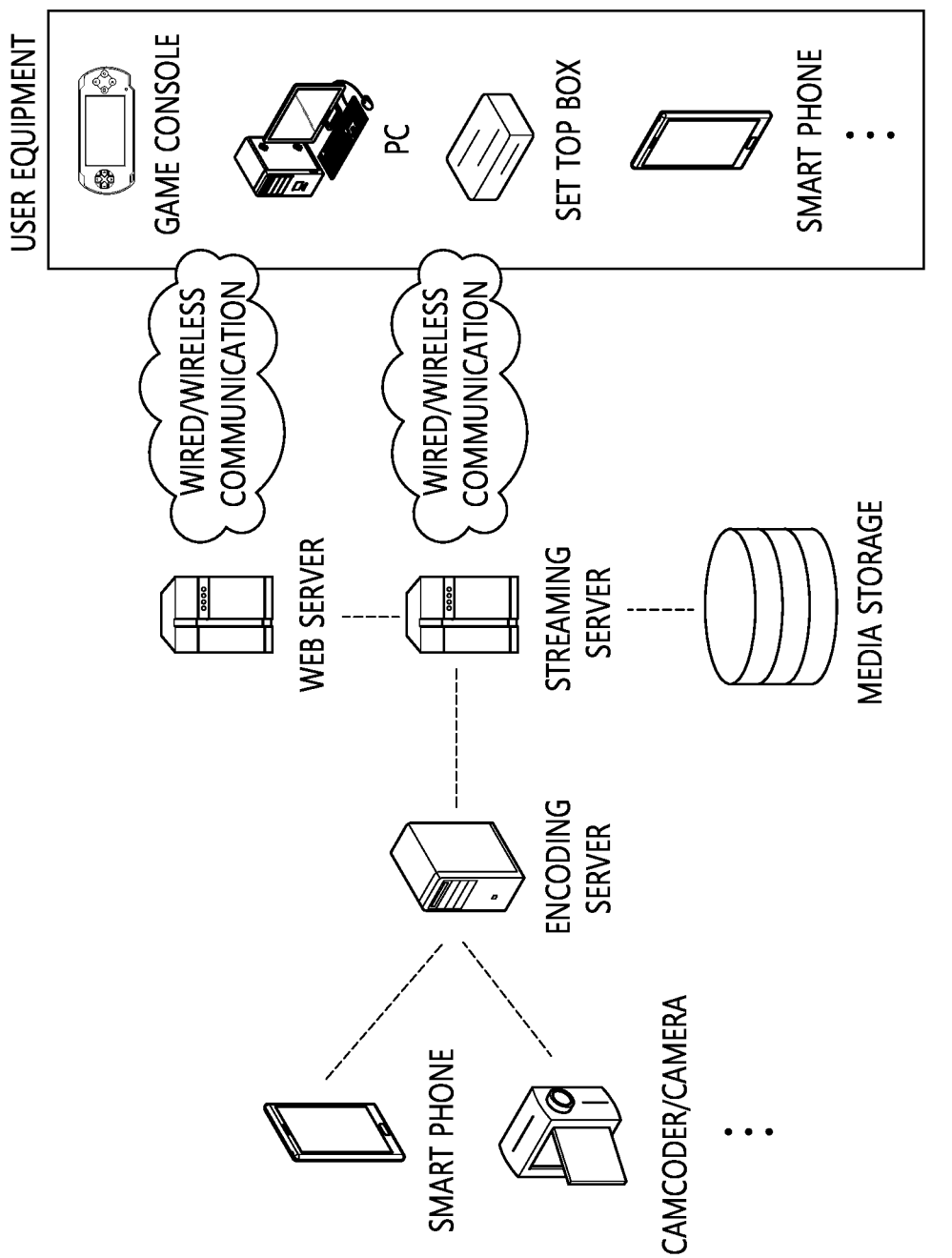
FIG. 36 illustratively represents a content streaming system structure diagram to which the disclosure of this document may be applied.

FIG. 36 represents an example of a contents streaming system to which this document may be applied.

Referring to FIG. 36, the content streaming system to which this document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which this document is applied. And the streaming server may temporarily store the bitstream in a process of transmitting or receiving the bitstream.

(section 9.5.4.2.1 Table 9-10 in VVC specification)

| | | | | | |
|---|---|---|---|---|---|
| intra_chroma_pred_mode[ ][ ] sps_cclm_enabled_flag = = 0 | 0 | bypass | na | na | na | na |
| intra_chroma_pred_mode[ ][ ] sps_cclm_enabled_flag = = 1 && bin at bindx equal to 2 = = 0 | 0 | 1 | 2 | bypass | na | na |

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an Ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
    deriving a luma intra prediction mode for a luma block corresponding to a chroma block of a current block;
    generating a chroma candidate mode list for the chroma block including a predetermined number of chroma intra candidates by using at least one of a right upward diagonal mode, a HORIZONTAL mode, a VERTICAL mode, a DC mode, a PLANAR mode, and a Direct Mode (DM) derived from the luma intra prediction mode;
    deriving a chroma intra prediction mode for the chroma block based on chroma prediction mode information related to one of the chroma intra candidates in the chroma candidate mode list; and
    generating a prediction sample for the chroma block based on the chroma intra prediction mode,
    wherein the DM is a prediction mode corresponding to a CR (center) position of the luma block,
    wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM,
    wherein a first chroma intra candidate is the DM,
    wherein a second chroma intra candidate is derived based on the pruning check between the DM and the prediction mode derived from one position among the TL, the TR, the BL and the BR positions of the luma block,
    wherein the prediction mode derived from the one position among the TL, the TR, the BL and the BR positions of the luma block is derived as the second chroma intra candidate, based on a result of the pruning check that the DM is not same as the prediction mode derived from the one position among the TL, the TR, the BL and the BR positions of the luma block, and
    wherein the PLANAR mode or the DC mode is derived as the second chroma intra candidate, based on a result of the pruning check that the DM is same as the prediction mode derived from the one position among the TL, the TR, the BL and the BR positions of the luma block.

2. The image decoding method of claim 1, wherein the generating the chroma candidate mode list comprises selecting three or five chroma intra candidates through the pruning check.

3. The image decoding method of claim 1, wherein the generating the chroma candidate mode list comprises:
    adding the DM as the first chroma intra candidate in the chroma candidate mode list; and
    adding, as the second chroma intra candidate in the chroma candidate mode list, the prediction mode corresponding to the TL which is not same as the DM as a result of determining whether or not the DM is same as the prediction mode corresponding to the TL of the luma block.

4. The image decoding method of claim 3, wherein the generating the chroma candidate mode list comprises:
    adding, as third to fifth chroma intra candidates in the chroma candidate mode list, based on the VERTICAL mode, the HORIZONTAL mode, the right upward diagonal mode, and a prediction mode adjacent to the DM depending on whether the DM and the prediction mode corresponding to the TL are the PLANAR mode or the DC mode when the DM is not same as the prediction mode corresponding to the TL.

5. The image decoding method of claim 3, wherein the generating the chroma candidate mode list comprises adding the PLANAR mode or the DC mode as the second chroma intra candidate depending on whether the DM is the PLANAR mode or the DC mode when the DM is same as the prediction mode corresponding to the TL.

6. The image decoding method of claim 1, further comprising receiving and decoding the chroma prediction mode information,
    wherein a first chroma prediction mode information in the chroma candidate mode list is decoded in a context modeling method, and wherein a rest of the chroma prediction mode information except the first chroma prediction mode information is decoded in a bypass method.

7. An image encoding method performed by an encoding apparatus, the method comprising:
    deriving a luma intra prediction mode for a luma block corresponding to a chroma block of a current block;
    generating a chroma candidate mode list for the chroma block including a predetermined number of chroma intra candidates by using at least one of a right upward diagonal mode, a HORIZONTAL mode, a VERTICAL mode, a DC mode, a PLANAR mode, and a Direct Mode (DM) derived from the luma intra prediction mode; and
    encoding chroma prediction mode information related to one of the chroma intra candidates in the chroma candidate mode list,
    wherein the DM is a prediction mode corresponding to a CR (center) position of the luma block,
    wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM, wherein a first chroma intra candidate is the DM, wherein a second chroma intra candidate is derived based on the pruning check between the DM and the prediction mode derived from one position among the TL, the TR, the BL and the BR positions of the luma block, wherein the prediction mode derived from the one position among the TL, the TR, the BL and the BR positions of the luma block is derived as the second chroma intra candidate, based on a result of the pruning check that the DM is not same as the prediction mode derived from the one position among the TL, the TR, the BL and the BR positions of the luma block and wherein the PLANAR mode or the DC mode is derived as the second chroma intra candidate, based on a result of the pruning check that the DM is same as the prediction mode derived from the one position among the TL, the TR, the BL and the BR positions of the luma block.

8. The image encoding method of claim 7, wherein the generating the chroma candidate mode list comprises:

adding the DM as the first chroma intra candidate in the chroma candidate mode list; and adding, as the second chroma intra candidate in the chroma candidate mode list, the prediction mode corresponding to the TL which is not same as the DM as a result of determining whether or not the DM is same as the prediction mode corresponding to the TL of the luma block.

9. The image encoding method of claim 8, wherein the generating the chroma candidate mode list comprises, adding, as third to fifth chroma intra candidates in the chroma candidate mode list, based on the VERTICAL mode, the HORIZONTAL mode, the right upward diagonal mode, and a prediction mode adjacent to the DM depending on whether the DM and the prediction mode corresponding to the TL are the PLANAR mode or the DC mode when the DM is not same as the prediction mode corresponding to the TL.

10. The image encoding method of claim 8, wherein the generating the chroma candidate mode list comprises adding the PLANAR mode or the DC mode as the second chroma intra candidate depending on whether the DM is the PLANAR mode or the DC mode when the DM is same as the prediction mode corresponding to the TL.

11. The image encoding method of claim 7, further comprising encoding the chroma prediction mode information, wherein a first chroma prediction mode information in the chroma candidate mode list is encoded in a context modeling method, and wherein a rest of chroma prediction mode information except the first chroma prediction mode information is encoded in a bypass method.

12. An image decoding apparatus, comprising:

an entropy decoder configured to decode luma intra prediction mode information for a luma block of a current block and decode chroma intra prediction mode information for a chroma block of the current block; and a predictor configured to derive a luma intra prediction mode for the luma block based on the luma intra prediction mode information, generate a chroma candidate mode list for the chroma block including a predetermined number of chroma intra candidates by using at least one of a right upward diagonal mode, a HORIZONTAL mode, a VERTICAL mode, a DC mode, a PLANAR mode, and a Direct Mode (DM) derived from the luma intra prediction mode, derive a chroma intra prediction mode for the chroma block based on the chroma prediction mode information related to one of the chroma intra candidates in the chroma candidate mode list, and generate a prediction sample for a chroma block based on the chroma intra prediction mode, wherein the DM is a prediction mode corresponding to a CR (center) position of the luma block, wherein the chroma intra candidates except the DM are derived through a pruning check of a prediction mode corresponding to any one of TL (top left), TR (top right), BL (bottom left) and BR (bottom right) of the luma block, the PLANAR mode, the DC mode, the VERTICAL mode, and the HORIZONTAL mode with the DM, wherein a first chroma intra candidate is the DM, wherein a second chroma intra candidate is derived based on the pruning check between the DM and the prediction mode derived from one position among the TL, the TR, the BL and the BR positions of the luma block, wherein the prediction mode derived from the one position among the TL, the TR, the BL and the BR positions of the luma block is derived as the second chroma intra candidate, based on a result of the pruning check that the DM is not same as the prediction mode derived from the one position among the TL, the TR, the BL and the BR positions of the luma block, and wherein the PLANAR mode or the DC mode is derived as the second chroma intra candidate, based on a result of the pruning check that the DM is same as the prediction mode derived from the one position among the TL, the TR, the BL and the BR positions of the luma block.

13. The image decoding apparatus of claim 12, wherein the predictor is configured to select three or five chroma intra candidates through the pruning check.

14. The image decoding apparatus of claim 12, wherein the predictor is configured to add the DM as the first chroma intra candidate in the chroma candidate mode list, and add, as the second chroma intra candidate in the chroma candidate mode list, the prediction mode corresponding to the TL which is not same as the DM as a result of determining whether or not the DM is same as the prediction mode corresponding to the TL of the luma block.

15. The image decoding apparatus of claim 14, wherein the predictor is configured to add the PLANAR mode or the DC mode as the second chroma intra candidate depending on whether the DM is the PLANAR mode or the DC mode when the DM is same as the prediction mode corresponding to the TL.

* * * * *